(12) United States Patent
Jones et al.

(10) Patent No.: US 8,577,728 B2
(45) Date of Patent: Nov. 5, 2013

(54) DISPLAY SYSTEM

(75) Inventors: John Clifford Jones, Worcestershire (GB); David Dix, Surrey (GB); Simon Gooch, Buckinghamshire (GB); Clive Mayne, Hertfordshire (GB); Steve Taylor, Cambridgeshire (GB); Richard Simms, Cambridgeshire (GB)

(73) Assignee: ZBD Displays Limited, Malvern, Worcestershire (GB)

( * ) Notice: Subject to any disclaimer, the term of this patent is extended or adjusted under 35 U.S.C. 154(b) by 939 days.

(21) Appl. No.: 12/501,819

(22) Filed: Jul. 13, 2009

(65) Prior Publication Data

US 2010/0106588 A1 Apr. 29, 2010

Related U.S. Application Data

(60) Provisional application No. 61/098,410, filed on Sep. 19, 2008.

(30) Foreign Application Priority Data

Jul. 11, 2008 (GB) .................................. 0812770.6

(51) Int. Cl.
*G06Q 20/00* (2012.01)

(52) U.S. Cl.
USPC ............................................ 705/16; 705/411

(58) Field of Classification Search
USPC ................................................ 705/16, 34, 26
See application file for complete search history.

(56) References Cited

U.S. PATENT DOCUMENTS

| 4,888,709 A | 12/1989 | Revesz et al. |
| 5,313,569 A | 5/1994 | Olsson et al. |
| 5,477,550 A | 12/1995 | Crisler et al. |

(Continued)

FOREIGN PATENT DOCUMENTS

| EP | 0921460 | 6/1999 |
| EP | 1798631 | 6/2007 |

(Continued)

OTHER PUBLICATIONS

International Search Report and Written Opinion mailed on Oct. 23, 2009 directed at application No. PCT/GB2009/050840; 15 pages.

(Continued)

*Primary Examiner* — Matthew Gart
*Assistant Examiner* — Rokib Masud
(74) *Attorney, Agent, or Firm* — Morrison & Foerster LLP

(57) ABSTRACT

A display system 10 for displaying information at a point of product display in a retail outlet comprising a communicator 12 for transmitting display information to a remote display module 18, the display module 18 being adapted in a first, low power mode to display information and in a second, higher power mode periodically, in a predetermined manner, to communicate with the communicator 12, the system 10 preferably being configured to enable determination of the accuracy and automated correction of the synchronization of a periodic communication between the communicator 12 and the display module 18 while the display module 18 continues to switch between first and second modes of operation enabling a low overall consumption of power by the display module 18 and more preferably wherein the display module 18 is adapted to switch between first and second power modes between receipt of a synchronization signal and a display information signal from the communicator 12.

21 Claims, 25 Drawing Sheets

(56) References Cited

U.S. PATENT DOCUMENTS

| | | |
|---|---|---|
| 5,513,659 A * | 5/1996 | Buuck et al. .................. 128/885 |
| 5,548,282 A * | 8/1996 | Escritt et al. ................. 340/5.91 |
| 5,797,132 A | 8/1998 | Altwasser |
| 6,249,332 B1 | 6/2001 | Bryan-Brown et al. |
| 6,456,348 B2 | 9/2002 | Bryan-Brown et al. |
| 7,072,973 B1 | 7/2006 | Newson et al. |
| 7,539,882 B2 * | 5/2009 | Jessup et al. .................. 713/300 |
| 2001/0020935 A1 | 9/2001 | Gelbman |
| 2001/0054005 A1 | 12/2001 | Hook et al. |
| 2003/0156090 A1 | 8/2003 | Munn et al. |
| 2004/0110499 A1 | 6/2004 | Kang et al. |
| 2006/0282324 A1 | 12/2006 | Mori et al. |
| 2006/0290691 A1 | 12/2006 | Sato et al. |
| 2007/0001889 A1 * | 1/2007 | Garlapati et al. ............. 341/155 |
| 2007/0283175 A1 * | 12/2007 | Marinkovic et al. .......... 713/320 |

FOREIGN PATENT DOCUMENTS

| | | |
|---|---|---|
| EP | 1 881 400 | 1/2008 |
| WO | WO-00/21231 | 4/2000 |
| WO | WO-00/63830 | 10/2000 |
| WO | WO-03/073261 | 9/2003 |
| WO | WO-03/083613 | 10/2003 |
| WO | WO-2005/085989 | 9/2005 |
| WO | WO-2006/067110 | 6/2006 |

OTHER PUBLICATIONS

GB Search Report dated Nov. 11, 2008 directed at application No. GB0812770.6; 2 pages.

Demand for Examination dated May 11, 2010, directed to International Application No. PCT/GB2009/050840; 18 pages.

Preliminary Report on Patentability mailed Sep. 16, 2010, directed to International Application No. PCT/GB2009/050840; 17 pages.

* cited by examiner

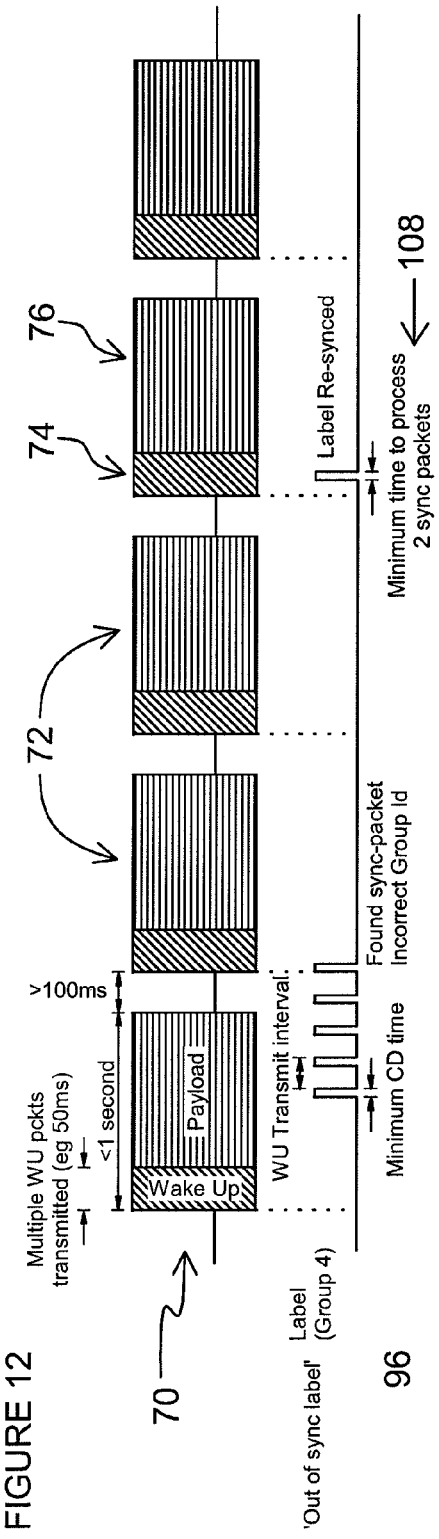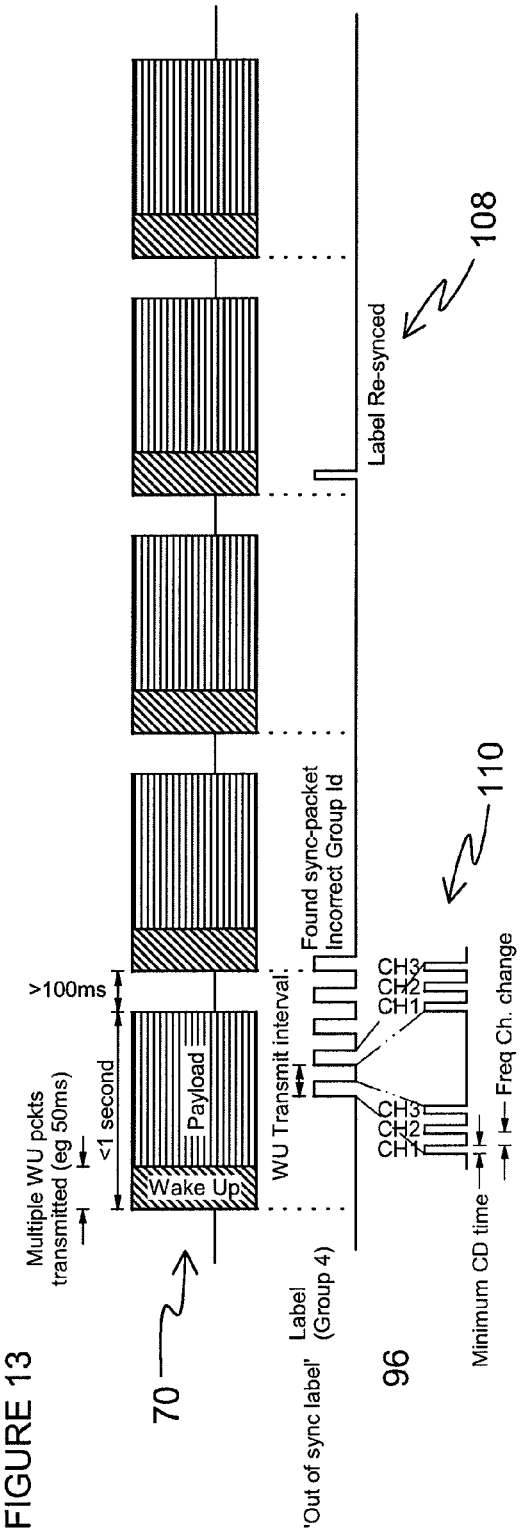

DISPLAY SYSTEM

The invention relates to a display system that is updated remotely using wireless communication and in particular, but not exclusively, to such systems comprising low power bistable or multi-stable displays, sometimes referred to as electronic paper. The display system may be used at the point of sale of items in a retail outlet or for similar applications where the information is displayed for long periods to one or many display units powered by batteries. It is an aim of the current invention to provide means by which the power usage is minimised, and the battery life is kept as long as is possible.

It is known to provide point of sale displays however these are generally rather complex with large displays of a commercial advertising nature, have high power needs and often require mains electricity supply. Even less grand displays and battery operated display systems presently available still draw large electrical power, hence, if not mains powered, require frequent battery changes. Moreover, the means for updating such displays is complex, burdensome and/or can require a user individually to address a display unit for example locally to update display information on the unit.

It is also known that electronic product information can be displayed using a multitude of self-contained display modules or Electronic Shelf Labels (ESLs), such as in U.S. Pat. No. 4,888,709 and U.S. Pat. No. 5,313,569. Herein, each ESL is provided with power from a battery, a means of communicating with a central processor (such as infared) and means by which the correct product information may be associated with the correct label. It has been recognised that a key issue associated with the ESL is the power consumption required to maintain the image. Means of re-charging the battery during periods of use have been proposed (such as in U.S. Pat. No. 5,548,282). Power is also kept low by using bistable displays (such as in US 2001/0020935 A1 and US 2003/0156090 A1), wherein the principal advantage enabled by the bistable display is to remove the need for expensive display driver software on each device, and allowing the wireless transmission of addressing information directly to the display. That is, the micro-controller and driving software are kept in a single control unit, and not included in the multitude of display units to save cost.

Common to these display systems is the limited information that can be displayed by each display unit or ESL. For example, the information is often limited to numeric information (such as price, and/or quantity) in combination with information pertaining to icons (such as "Sale", "special offer" etc). With such display systems there is a balance between the amount of information that can be displayed and the power required to update and maintain the information.

The present invention seeks to provide improvements in displays and display systems particularly in the retail environment; beneficially to provide low power consuming shelf displays requiring infrequent battery changes such as several years apart, which can provide useful consumer information such as product data including price, price deals, manufacturer, product specification, product name, brand information, stock levels, weight, expiry, product bar code, and the like, and which can be updated remotely from a central system in an efficient and low power consuming manner. Uniquely, the current invention allows much higher bandwidth of information to be displayed than has previously been possible, whilst maintaining the most efficient use of power, and hence long duration of battery life, to be achieved.

An aspect of the invention provides a display system for displaying information at a point of product display in a retail outlet comprising a communicator and a remote display module, the communicator in use transmitting display information to the remote display module and the display module being adapted in a low power mode to display information and in a higher power mode periodically, in a predetermined manner, to communicate with the communicator thereby to obtain updated display information, the display module and the display module being adapted to switch between first and second modes of operation between communications to enable low overall consumption of power by the display module.

Yet another aspect of the invention provides a display system for use in space planning applications.

Other aspects and features of the invention will be apparent from the appended claims and the rest of the specification.

Embodiments of the invention will now be described, by way of example only, with reference to the accompanying drawings in which:

FIG. 12 is a schematic block diagram of timing sequences related to re-synchronisation;

FIG. 13 is a further block diagram of timing sequences related to re-synchronisation over different frequencies;

Figure 1:
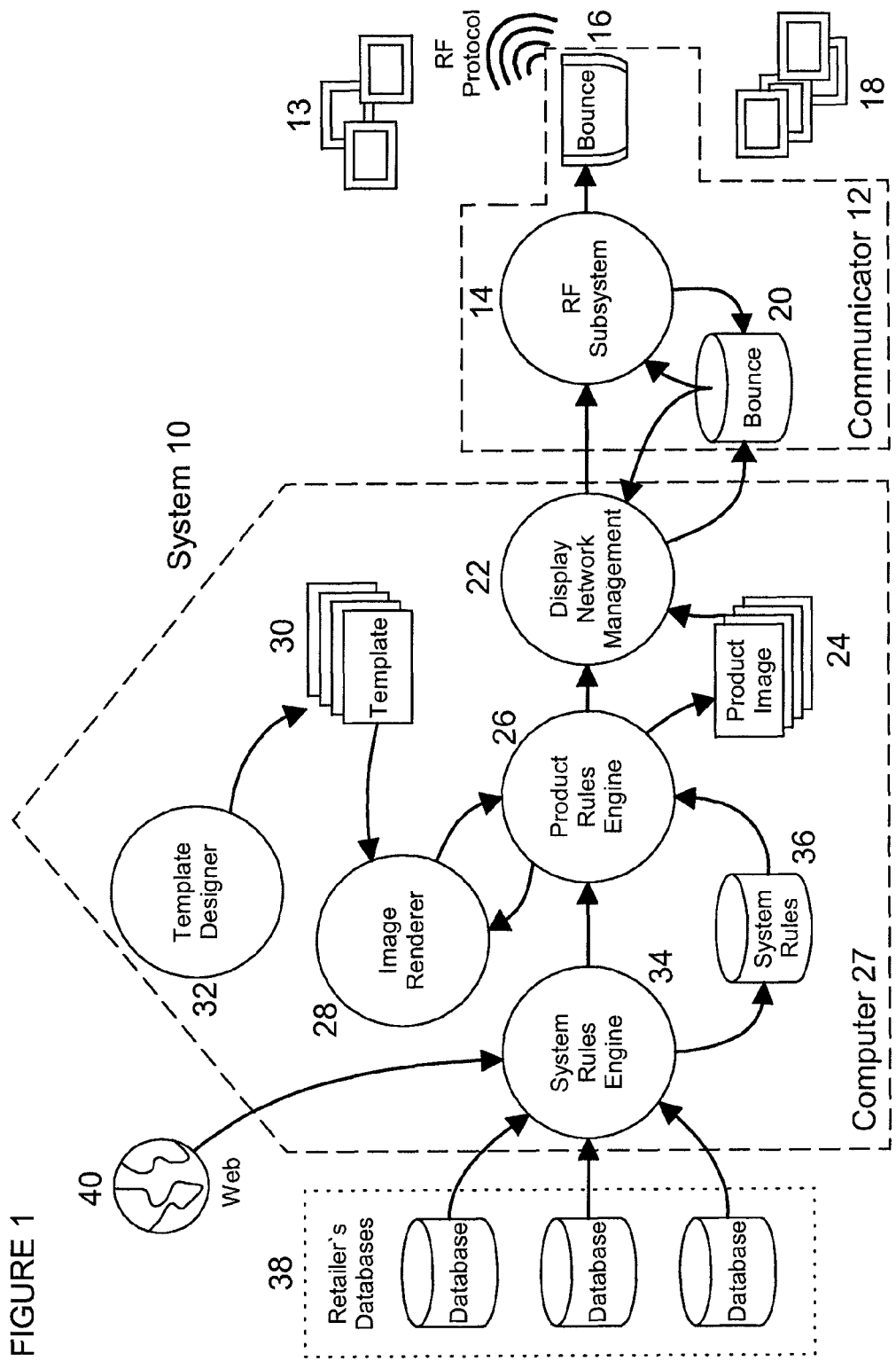
FIG. 1 is a schematic block diagram of a display system according to the invention.

Referring to FIG. 1 there is shown an overview of the display system 10 according to the invention. At the heart of the display system 10 is a communicator 12 which comprises a controller 14 (sometimes referred to as the RF subsystem), a communications module 16 which transfers display information to one or more display modules 18. Beneficially, the communicator 12 can be centrally located within a premises such as a retail outlet and comprise one or more communication modules 16 to enable communication with one or more display modules 18 positioned throughout the premises. Display system 10 further comprises a communications database 20 in communication with both the controller 14 and a display network management module 22. Display network management module 22 enables a user to control the communicator 12 and also to receive information from a product image database 24 and a product rules engine 26. In fact the display network management module 22 might be in the form of a computer software package installed in computer 27, such as a standard office computer system comprising microprocessor and various memory storage means such as RAM and a hard drive and peripheral devices for interfacing with the user such as a keyboard display and mouse for example having various applications installed to enable functionality of the display network management module 22 product rules engine 26 and so on. The product rules engine 26 comprises an image renderer function 28, image templates 30 and a template designer module 32. Product rules engine 26 is also in communication with a system rules engine 34 enabling communication of business rules via business rules database 36. The system rules engine 34 is in communication with one or more databases such as retailer databases related to product information for example and also to an external network 40 such as the Internet and hence the World Wide Web.

Figure 2:
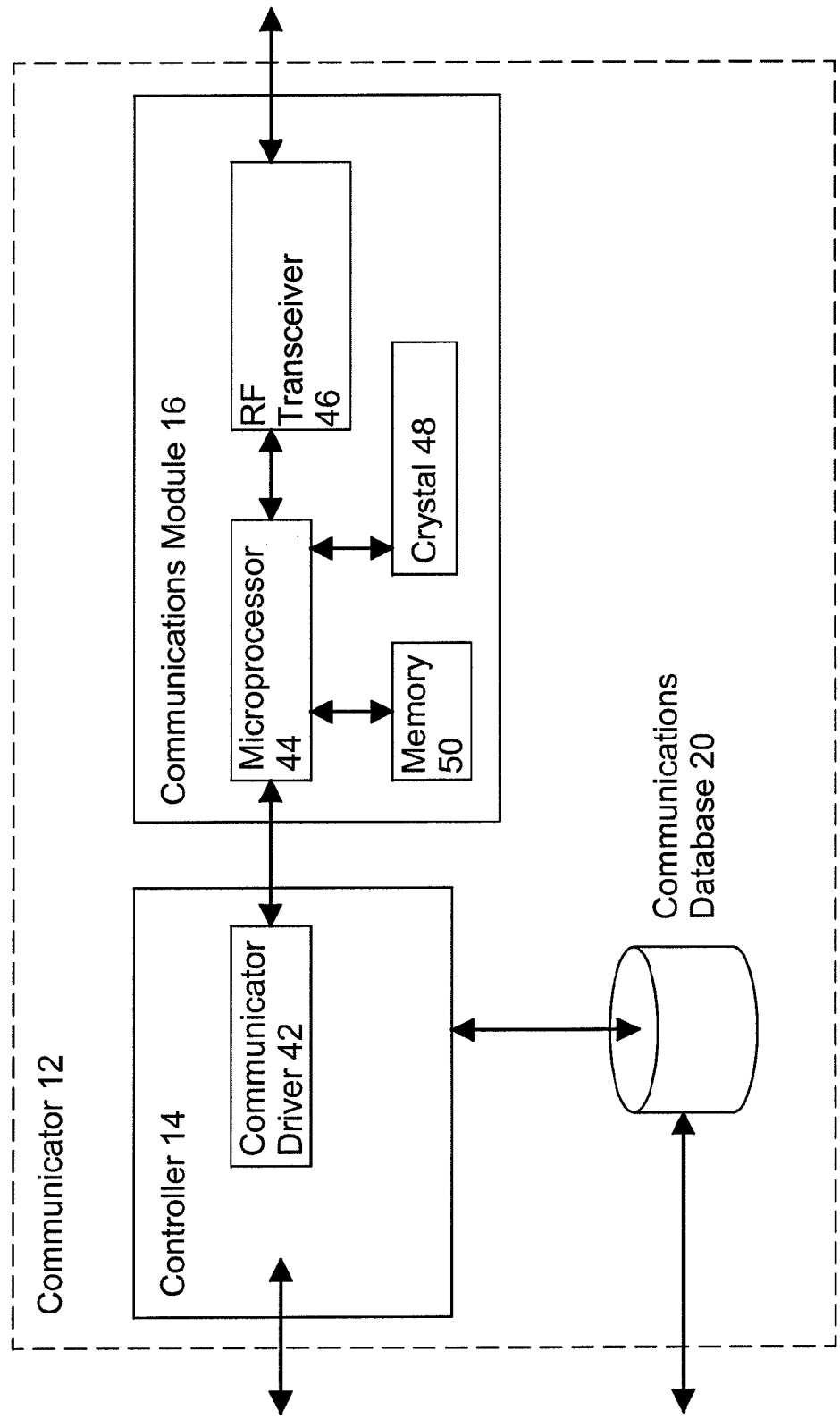
FIG. 2 is a schematic block diagram of a communicator 12 forming part of the system shown in FIG. 1.
Figure 3:
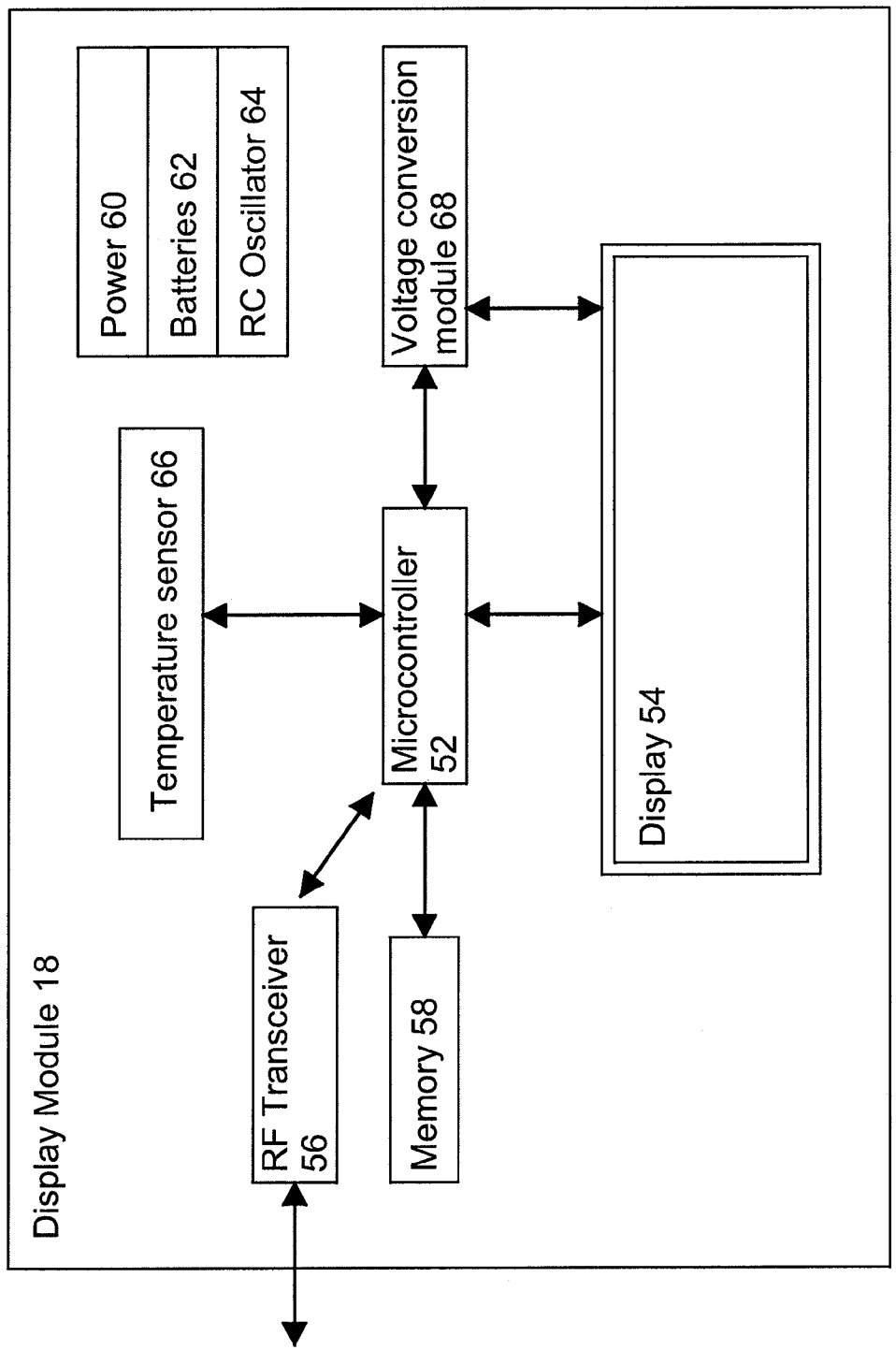
FIG. 3 is a schematic block diagram of a display module forming part of the system shown in FIG. 1.

Referring to FIG. 2 there is shown a schematic block diagram of communicator 12 (RF subsystem) comprising controller 14 having a communications driver 42 for driving the communications module(s) 16, wherein communications module 16 comprises a microcontroller 44 such as a microprocessor, an RF transceiver 46 for communicating with the display modules 18, a crystal 48 and a memory 50. One or more communications modules 16 might be provided in a display system 10 according to the invention and accordingly controller 14 is adapted to enable communication via communication driver 42 with each of the one or more communication modules 16.

All individual items can additionally comprise local interface connections or input and output ports thereby to enable a user to directly communicate with each individual item (such as controller 14, communication module 16, or display module 18) using a local display keyboard and mouse for example. Specific reference to such user interface for individual items is not necessarily referred to directly in relation to the following descriptions of components of the system 10.

Communications Database 20

The communications database 20 is shared between the communicator 12 and the display network management module 22. A shared queue of commands and status information is used for passing messages between the communicator 12 and the display network management module 22.

Communicator Service

The communicator service consists of software executing on controller 14 to manage the delivery of commands and data to the appropriate display modules 18 via a communications protocol such as an RF protocol. The communicator service monitors the communications database 20 shared queue for new commands that have been added from the display network management module 22. When a command is detected the communicator service retrieves it from the communications database 20 and issues a corresponding command to the communications driver 42 for delivery to a display module 18.

The communicator service ensures that the communications protocol is used as effectively as possible and issues commands to multiple display modules 18 to fill timeslots as discussed later. By analysing the queued commands the communicator service is able to ensure that if there is data available then each timeslot is filled to optimise data throughput.

When acknowledgements are received from a display module 18, the corresponding command in the database queue is updated with status information. The communicator service uses sessions for display module communications, allowing multiple commands and their data to be transmitted to a display module 18 in a single session.

Communications Driver 42

The communications driver 42 consists of software to interface between the communicator service application and the communicator hardware 12. When commands are delivered by the communicator service they are passed down to the communications module 16 for scheduling and transmission to the appropriate display module 18. The communications driver 42 is responsible for managing the hardware interface between the communicator 12 and the computer or controller 14. It provides notification of when the communicator 12 hardware is added or removed from the system and manages the system resources necessary to ensure communication can take place.

Communications Module 16

The communications module 16 consists of a microcontroller 44, memory 50, an accurate crystal 48 and an RF transceiver 46. It receives commands and data from the communications driver 42 and processes these to output them over the RF transceiver 46 using the communications (RF) protocol. It manages the multiple sessions between the communicator service and the display modules 18, sending data to display modules 18 in their appropriate timeslot and processing the received acknowledgements. Communications module 16 is also responsible for ensuring that synchronisation signals 74, or SYNC frames are periodically transmitted within a precise timing window making it possible for all display modules 18 to remain in synchronisation.

A synchronisation signal 74 or SYNC frame consists of multiple packets of data or sync packets 82. Each packet contains an offset from the centre of the sync period to enable a display module to re-adjust its clock and take care of any drift that may have occurred since the last SYNC frame was received. The SYNC frame also contains a timeslot identifier and may have a number, say up to two, display module 18 addresses to indicate what display modules 18 need to receive their next command.

Data and commands are transmitted during each timeslot to the appropriate display module 18. Commands may take multiple timeslots to complete. The communicator 12 manages the content for each timeslot based on the commands and data that have been issued by the communicator service.

Display Module 18

The display module 18 comprises low-power multidisplay 54, such as bistable LCD available from ZBD Displays Limited of Malvern, UK, and as described in U.S. Pat. No. 6,249,332 and U.S. Pat. No. 6,456,348. The display 54 preferably is able to display a matrix array in a multitude of sizes, typically with 320×240, 400×160 or 224×90 pixels, in which the pixels form a graphic image with between 60 and 200 dpi. Typically, this means that the display has dimensions in the order of 25 to 80 mm in height and 70 to 100 mm in width with an ability to display images in a 100 dpi resolution. Key to the invention is that the image is maintained on the display without any power, wherein power is only used to update the image being displayed. Consequently the battery life for such a display can be in the order of many years. Other bistable displays may be used, including electro-phoretic ink, bistable cholesteric, bistable twisted nematic, ferroelectric liquid crystal and/or electro-chromic displays. Common to all of the displays that are suited to the use is that they must retain the image for long periods without any applied power; the image should be retained despite shock to the unit (such as mechanical shock from knocking or pressing the display, or thermal shock associated with sudden changes in the environment).

The display 54 is connected to an electronic circuit comprising a microcontroller 52, memory 58, an RF transceiver 56 such as a half duplex transceiver, a temperature sensor 66 and a voltage conversion module 68. The display module 18 further comprise a power supply 60 comprising two forms of power for different modes of operation of the display module 18. Power supply 60 comprises a solar cell, battery or batteries 62 such as a lithium manganese dioxide primary cell to enable full operation of the display module 18 such as enabling communication with the communications module 16, and to enable a lower power (sleep) mode of operation sufficient to enable the module to synchronise, with the aid of RC oscillator 64, switching between lower power (eg virtually display only) and higher power modes of operation. In the higher power mode the display module 18 receives commands and data via the RF transceiver 56, carries out the actions specified in the commands and responds with an acknowledgement when the action is complete.

The RF transceiver 56 is used to receive commands and data. Normally the transceiver 56 is in a low power standby state. It is periodically powered up into receive mode for a very short period. During this period a packet of synchronisation data or SYNC packet 82 is normally received and the microcontroller uses the data within the SYNC packet 82 to recalibrate the internal system wakeup clock using microcontroller 52 to ensure it remains in synchronisation with the main communicator 12. If the SYNC packet 82 also contains the network address of the display module 18 it will remain powered to receive the following command(s) and data packets. Upon completion of a command(s), a command acknowledgement is transmitted containing the command status information. If the SYNC packet 82 does not contain the network address of the display module 18 it will immediately return to the low power state until the next SYNC packet 82 is expected When a command and any associated data have been received, and acknowledgement(s) transmitted, the microcontroller 52 then place the RF transceiver 56 in a low power standby mode until the next SYNC packet 82 is expected and process the command(s).

A display update consists of a command to download an image into memory 58, followed by a command to update the LCD display 54. Display updates require differing voltages and timings based on the temperature of the LCD display 54. During a display 54 update the microcontroller 52 obtains a temperature reading from the temperature sensor 66, generates the appropriate display update voltages using the voltage conversion module 68 and applies a pre-determined waveform to the LCD display 54 to perform the update. Before the update the microcontroller 52 powers off the temperature sensor 66. After the update the voltage conversion module 68 is powered off and then the microcontroller 52 enters a very low power standby state. In standby mode the microcontroller 52 is placed in a very low power state to conserve battery power. During RF communications the microcontroller 52 and the RF transceiver 56 are powered. During a display update microcontroller 52, temperature sensor 66, voltage conversion module 68 and display 54 are powered.

Communications (RF) Protocol

Figure 4:
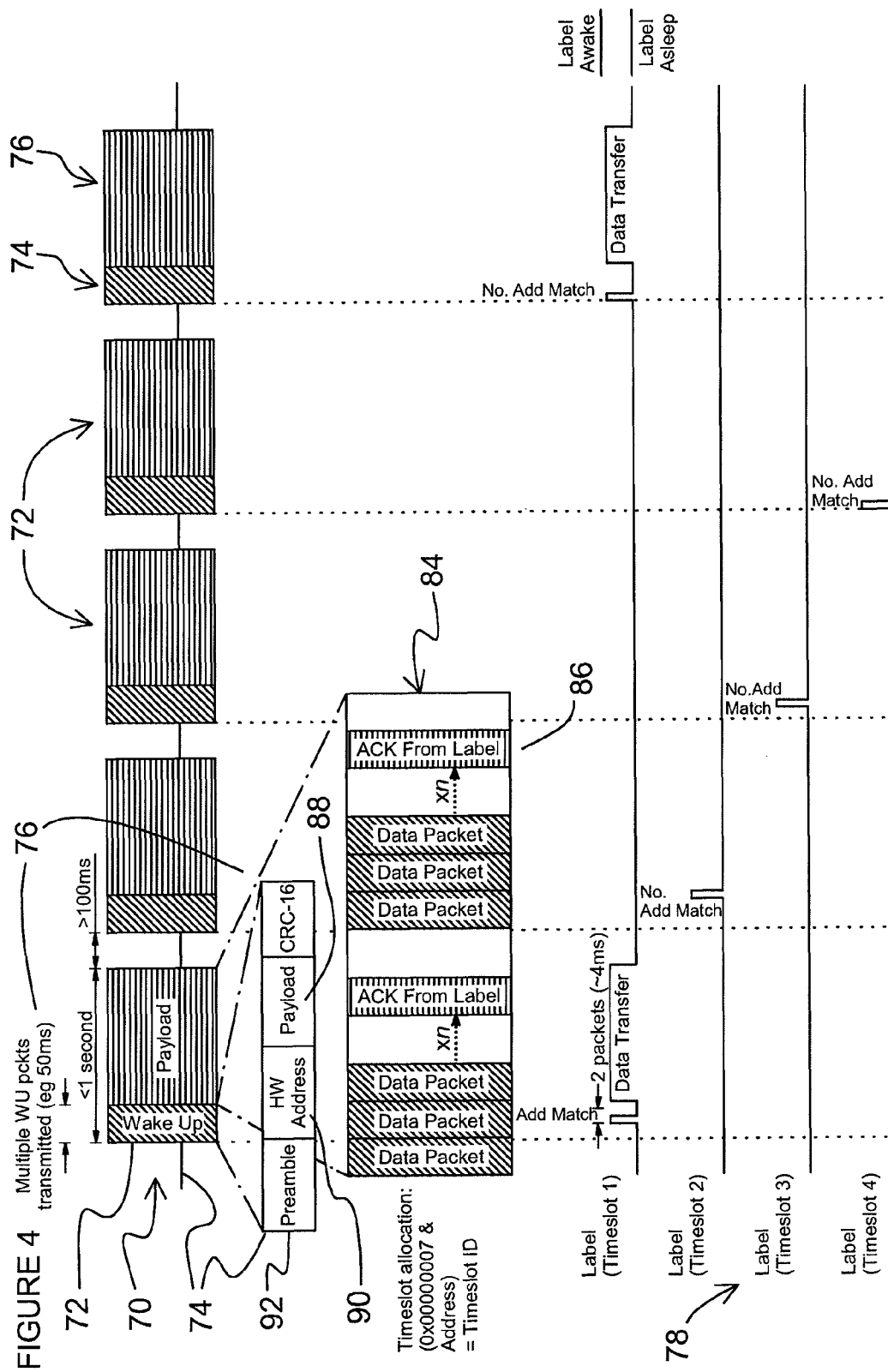
FIG. 4 is a schematic block diagram related to data transfer in allocated time slots.

Referring to FIG. 4 there is a shown schematically a signal 70 transmitted by a communications module 16 to a plurality of display modules 18, wherein the signal 70 comprises a series of discrete, time separated elements 72; each element 72 comprising a synchronisation or wake up component 74 and a data or payload component 76, and being associated with a specific timeslot 78. Here four timeslots 78 are used, each having a series of labelled signal elements 72 associated with its group display modules 18 conveniently to facilitate the low power but high bandwidth communications protocol. The communications protocol utilises a periodic series 80 of synchronisation pulses 82 transmitted by a communications module 16 to enable time division multiplexing of the data to be sent to the target display modules 18.

Figure 5:
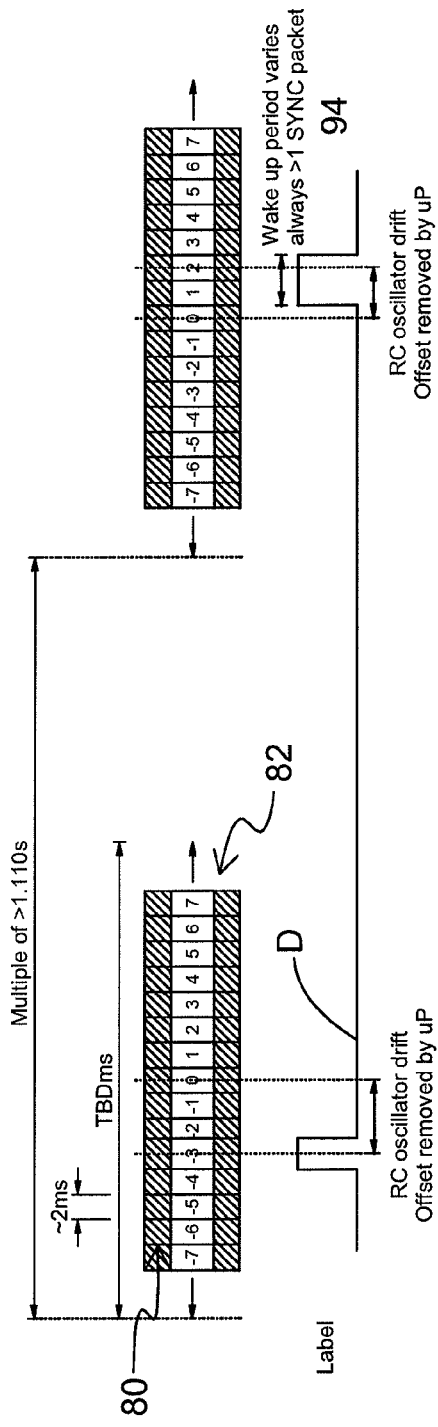
FIG. 5 is a schematic block diagram showing the synchronisation packet.

The wake up or synchronisation component 74 contains information regarding which display modules 18 the communications module 16 wants to communicate with in that timeslot 78 as well as a measure of exactly where in the timeslot the display module 18 has woken up. This is shown schematically in FIG. 5 wherein it can be seen that series 80 of sync packets 82 might comprise a total of 15 packets 82 grouped symmetrically about a central or primary data packet labelled 0. In order to be synchronised with the relevant timeslot 78 for a display module 18, the display module 18 should enter the higher power mode and turn on RF transceiver 56 appropriately to receive the primary data packet labelled 0. As shown in FIG. 5, the transceiver is switched on for a duration slightly greater than one data packet (that is up to about 4 milliseconds and accordingly receives all of the sync packet 82 labelled −3 (that is 3 sync packets 82 away from the primary sync packet labelled 0). Accordingly, microcontroller 52 is able to recalibrate the clock in display module 18 in order subsequently more accurately to switch from lower power to higher power modes of operation at the correct time. Beneficially therefore the clock arrangement on an individual display module 18 can be of relatively low tolerance whereas the primary clock mechanism comprising for example crystal 48 within the communications module 16, should be of much tighter tolerance and susceptible to low drift itself. In this manner, the cost of an individual display unit may be kept to a minimum, whilst ensuring that the power used is also minimised (since substantial errors in the synchronisation that may result from using low tolerance clock may cause substantial and un-necessary use of battery power). In FIG. 5 switching operations for a display module 18 are shown wherein the first drift D is compensated from −3 to 0 whereas in the second the drift D is compensated from +2 to 0.

During the period between the sync pulse components 74 the display modules 18 are in a deep sleep, or low power, mode running off a low-power RC oscillator 64. This feature helps extends battery life considerably.

A series 84 of data packets 86 are broadcast after each sync pulse components 74 with the maximum combined time of each signal element 72, or sync pulse/data packet burst, being no more than a predetermined period such as one second.

Figure 6:
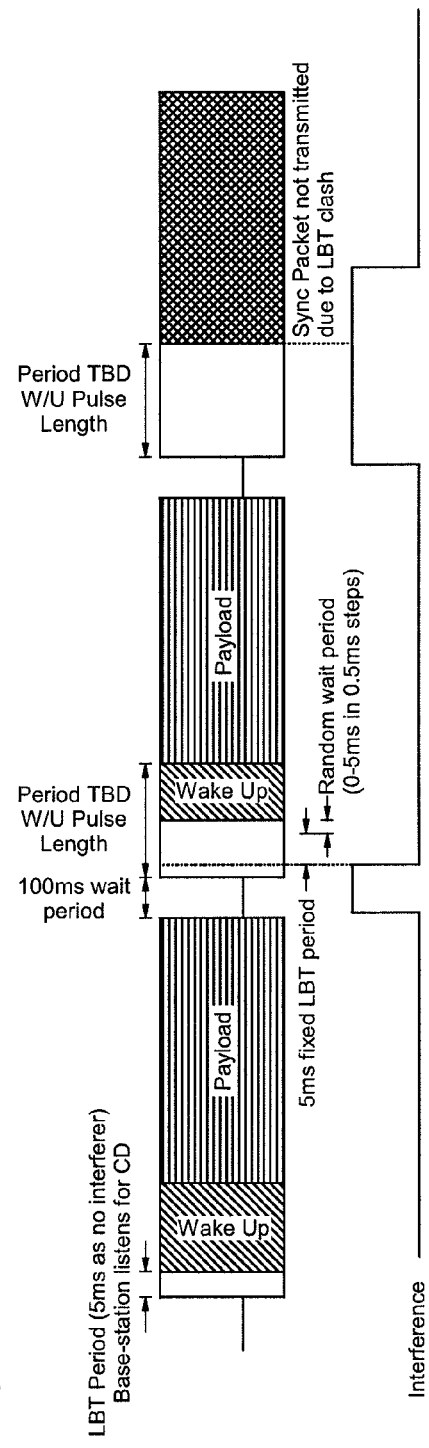
FIG. 6 is a schematic block diagram showing individual wake up packets and payloads transmitted by the communicator 12 in system shown in FIG. 1.

Moreover, Listen Before Talk (LBT) is implemented between timeslots 78 (or signal elements 72) to reduce the effect of duty cycle restrictions as shown in FIG. 6. Data packets are acknowledged in groups to increase the protocol efficiency. All packets have a unique ID and are repeated if they fail to get through e.g. due to interference.

Display modules 18 are also placed into distinct timeslots 78 based on their address, allowing the polling period to be further extended. This is to ensure an even distribution of displays in a store or retail outlet.

The transmission protocol during the data transfer phase utilises a sliding window protocol using selective repeat. Both the sender and receiver maintain a window of acceptable sequence numbers, acknowledging only those packets that are received without error. The protocol allows communication to a maximum number and preferably two display modules 18 during a single timeslot 78.

Communication with display modules 18 is performed in sessions. Each session can contain any number of commands and their associated data. Sessions can span across multiple transmission elements 72 for the relevant timeslots. A typical image update command and data may take two to four elements 72 to complete.

The communication protocol utilises a periodic series of synchronisation pulses transmitted by a communications module 16 to enable time division multiplexing of the data to be sent to the target displays.

Frequency Allocation

In Europe the centre frequency 869.85 MHz is used as the initial control channel. Data channels are located in the frequency ranges 868.0-868.6 MHz and 868.7-869.2 MHz.

In USA the centre frequency 927.5 MHz is used as the initial control channel. Data channels are located in the frequency range 902-928 MHz.

In other territories suitable frequencies can be allocated to comply with legislation.

Display Timeslot

Each series of display modules 18 is allocated a polling timeslot 78 according to an aspect of the display modules address, and preferably the LSB of its address. The exact number of timeslots can be governed by the display configuration transmitted during the initial set-up procedure and a default setting can be 8 timeslots. The number of timeslots should preferably be a power of 2. The grouping of the displays in timeslots can adhere to the following rule: Timeslot=Display Address & (n−1) (where n is the number of timeslots available). Here 4 timeslots are used as shown in FIG. 4.

Standard Polling

An individual display module 18 is adapted to associate with a communications module 16 that has a matching Network-ID. Once the display is associated with the communications module 16 it will wake up every appropriate polling period and attempt to find a sync packet 82. If a sync packet 82 is not found, it will go back to sleep and wake-up at the next scheduled timeslot 78. This procedure occurs a programmable number of times, such as ten, and if a valid sync packet 82 has not been found the display module 18 attempts to re-synchronise.

The period between sync pulse component 74 is preferably greater than 1.1 second+10 ms (see FIG. 4). Preferably this setting is configurable during the initial label configuration. The sync pulse component 74 actually consists of a series 80 of back-to-back sync packets 82 broadcast for the sync pulse period as shown in FIG. 5. The sync pulse packet 82 contains three primary sets of information, namely:

a field 88 measuring the time to the centre of the sync pulse period, to allow the display to compensate for the drift of its oscillator, a list 90 of the, and preferably only two, addresses for display modules 18 that the communications module 16 wishes to communicate with during the timeslot, and a 'timeslot-ID' 92 stating which timeslot that the sync pulse component 74 is targeted at, as this enables a faster re-synchronisation time for display modules 18.

The length of the wake-up period 94 varies depending on where in the packet structure the display module 18 wakes-up. As a maximum the display module 18 stays awake for two packets 82, and as a minimum 1 packet. If a valid or complete packet 82 has been processed the RF transceiver 56 is powered down immediately to conserve power, and preferably so are all electrical components other than those essential in order to enable synchronised switching back on of the display module 16 to receive data from communicator 12 at a predetermined future time.

Preferably the system 10 is configured to operate a LBT (listen-before-talk) feature to deal with any RF interference on the same radio channel. If the transmitter (communications module 16) detects interference on the channel that does not disappear within a pre-determined time the communications module 16 skips that timeslot. This is to ensure that the remaining display modules 18 stay in sync with the synchronisation component 74.

The LBT period is defined as: $t_L = t_F + t_{PS}$ where, $t_F$ is fixed at say 5 ms, and $t_{ps}$ varies between 0-5 ms in a pseudo-random manner with steps of say 0.5 ms. This is set to '0' if the fixed period passes with no interference on the channel. This is shown schematically in FIG. 6.

Data Transfer

The transmission protocol utilises a modified sliding window protocol using selective repeat. According to a standard sliding window protocol, directional data transmission is enabled between two units wherein the transmitter of data fundamentally defines a window size for a finite number of packets of data, all of which packets of data are transmitted to the other, recipient unit. The transmitter does not then send further data packets until acknowledgment of receipt of the first data packet in the series is satisfactorily acknowledged by the recipient unit. Depending on the number of data packets acknowledged by the recipient unit, further data packets are sent in series by the transmitter moving on aggregate a number of transmitted packets up to but not exceeding the defined window size as being transmitted to the recipient unit and not acknowledged or received by the recipient unit. Hence the window of data packets being transmitted slides progressively as individual packets are acknowledged by the recipient unit. However, here a variation is described wherein both the sender and receiver maintain a window of acceptable sequence numbers. The maximum window size is set and each data packet is uniquely identified with a 5-bit (16 unique packets) ID so that the receiver can unambiguously tell the difference between a repeated packet and a new transmission. Only eight unacknowledged packets can be outstanding at any instance. The transmission window extends 8 packets from the oldest unacknowledged packet ID (i.e. the most outstanding packet). The receiver therefore maintains a receive buffer of 8 packets.

The Acknowledgement packet consists of a 16-bit length bitmap that corresponds to the locations in the display receive buffer. A '1' implies that a packet was successfully loaded into that location whilst a '0' implies that no data was received for that slot.

There is provision for transmitting data to up to a predefined number, here two display modules 18 in each timeslot 78. Assuming a single display module 18 address match the following process takes place:

1) Display module 18 wakes up according to its polling schedule 78, locates a sync packet 82 and finds an address match (in field 90).

2) Display module 18 sleeps until sync packet 74 period expires, and then wakes up ready to process data in payload component 76.

3) Data is transmitted to the target display module 18 in bursts of up to a set number, here 8 packets 86. If this is the first data packet in a session the appropriate command bit is set to reset the packet counts. Each data packet 86 preferably contains the following information: Network ID, Software Address, Packet ID, Command Information, Payload 4) If 8 packets are received, or the display module 18 receives the last packet in a burst, it immediately transmits an ACK packet. The final packet in the timeslot 78 has a command bit set indicating that fact. An ACK will also be sent if the display module 18 detects more than 3 ms to 5 ms of clear channel as this implies that the sender has stopped transmitting. (This occurs if the transmitter hits the upper limit of its window).

5) The acknowledgement packet contains a list of packets that need to be re-transmitted. This is detailed in the packet structure.

6) The communications module 16 repeats the failed packets, and fills the remaining packet slots with any more data that remains to be transmitted until it hits the upper limit of its transmission window.

7) This process repeats until either all the data has been sent (end of session bit set), or the time slot 78 expires.

8) If the time slot expires before all the data has been sent the communications module 16 will inform the microcontroller 44 to queue the remaining data for transmission in a following timeslot. This will recommence from the last packet ID that was acknowledged. The communications module 16 tracks the last packet ID for all open communication sessions.

The communications module 16 sets the 'start of session' bit at the beginning of a data transmission exchange. (i.e one call of SendPacket( )). This resets the packet IDs at both ends of the link.

The communications module 16 sets the 'end of session' bit in the command packet when it has no more data to be sent to the display in the current data session. At this point the communications module 16 keeps the data channel open to the display until it receives a packet with the 'session-end' bit also set. The sending of this bit will also cause the packet-ids to be reset at both ends of the link.

Even if there is no more data to be transmitted from the communications module 16 to a specific display module 18, if a return 'end of session' packet has not been received the communications module 16 will wake that display module 18 up during the next timeslot. This is to handle the case where there is still valid return data but the timeslot has expired.

Return data packets from the display should be transmitted in the acknowledgement packet period.

Preferably there should never be more than 4.5 ms of dead-space between packets. This is to ensure that another transmitter competing on the channel cannot start data transfer.

If packets are not being removed from the display receive buffer by the application firmware the display will send a (NYET) acknowledgment packet. This will force the communications module 16 to retry the packets until the display is in a condition where it can acknowledge the data. There will be a programmable retry count before the Communicator 12 flags an error. The communications module 16 listens after it has finished transmitting every burst of data packets. If it does not sense a carrier within a predetermined period of the burst ending it assumes that the previous packets were lost and retransmits the payload. This again prevents the channel being occupied, and is an important part of the system flow control.

Under adverse channel conditions the protocol falls back to acknowledging every packet received. However, if the channel quality is good 8 data packets 82 will be sent each burst. This is to optimise the throughput on channels with a low BER (bit error rate) as shown in FIG. 7.

The display modules receive buffer only has to have as many locations as the size of the window. This reduces the memory overhead of the protocol.

Figure 7:
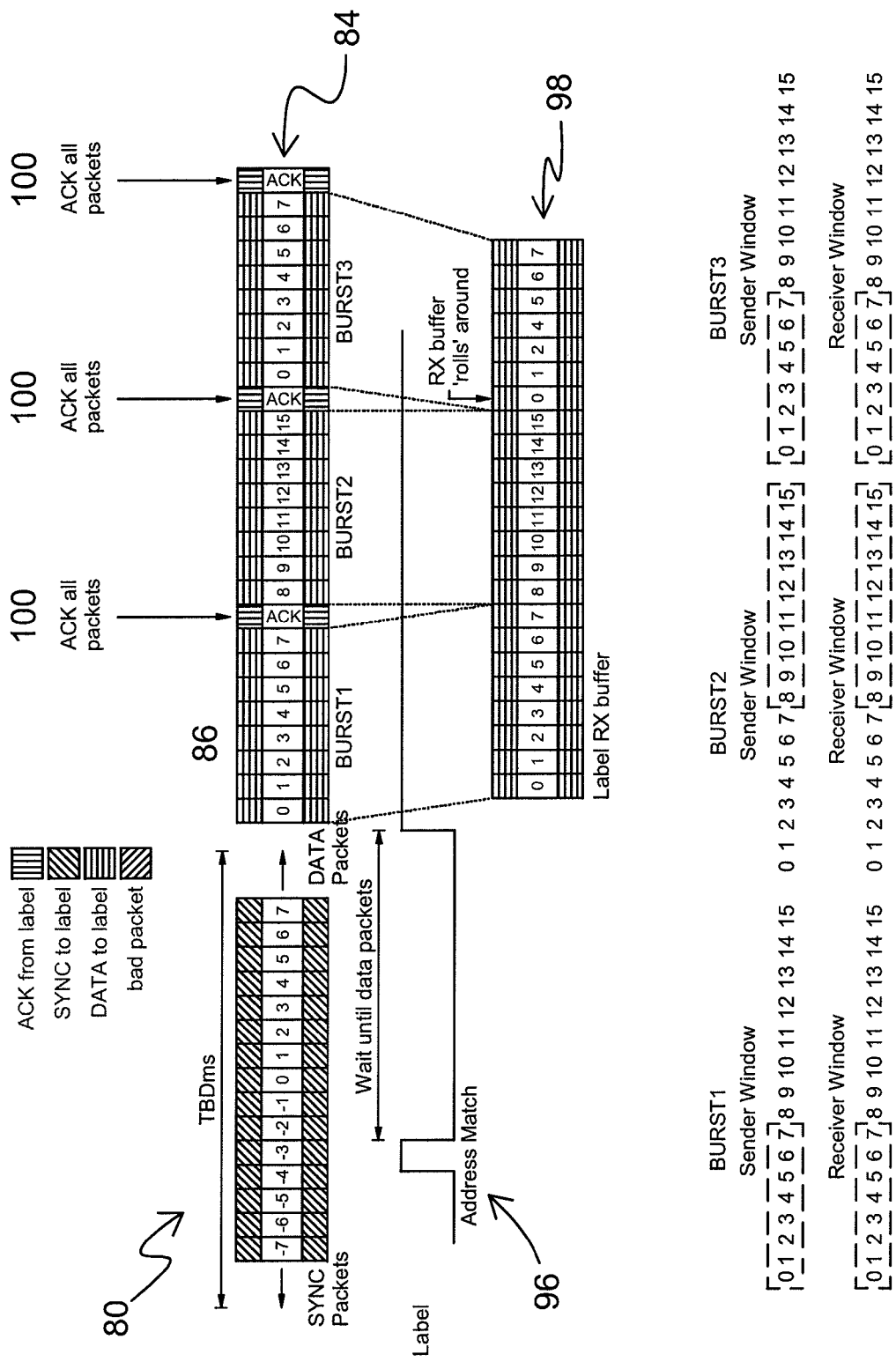
FIG. 7 is a schematic timing diagram related to low Bit Error Rate (BER)
Figure 8:
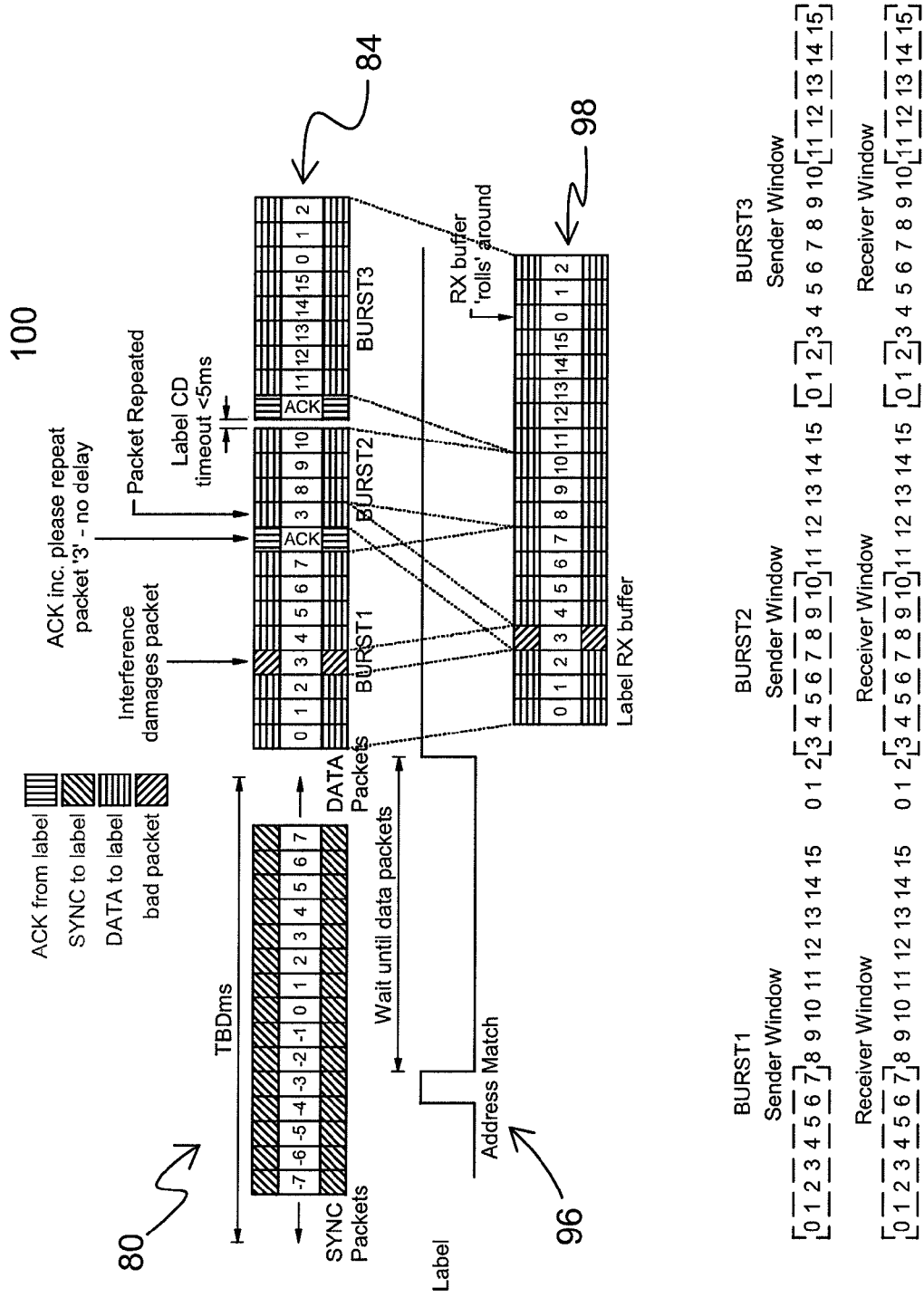
FIG. 8 is a schematic timing diagram related to medium BER.
Figure 9:
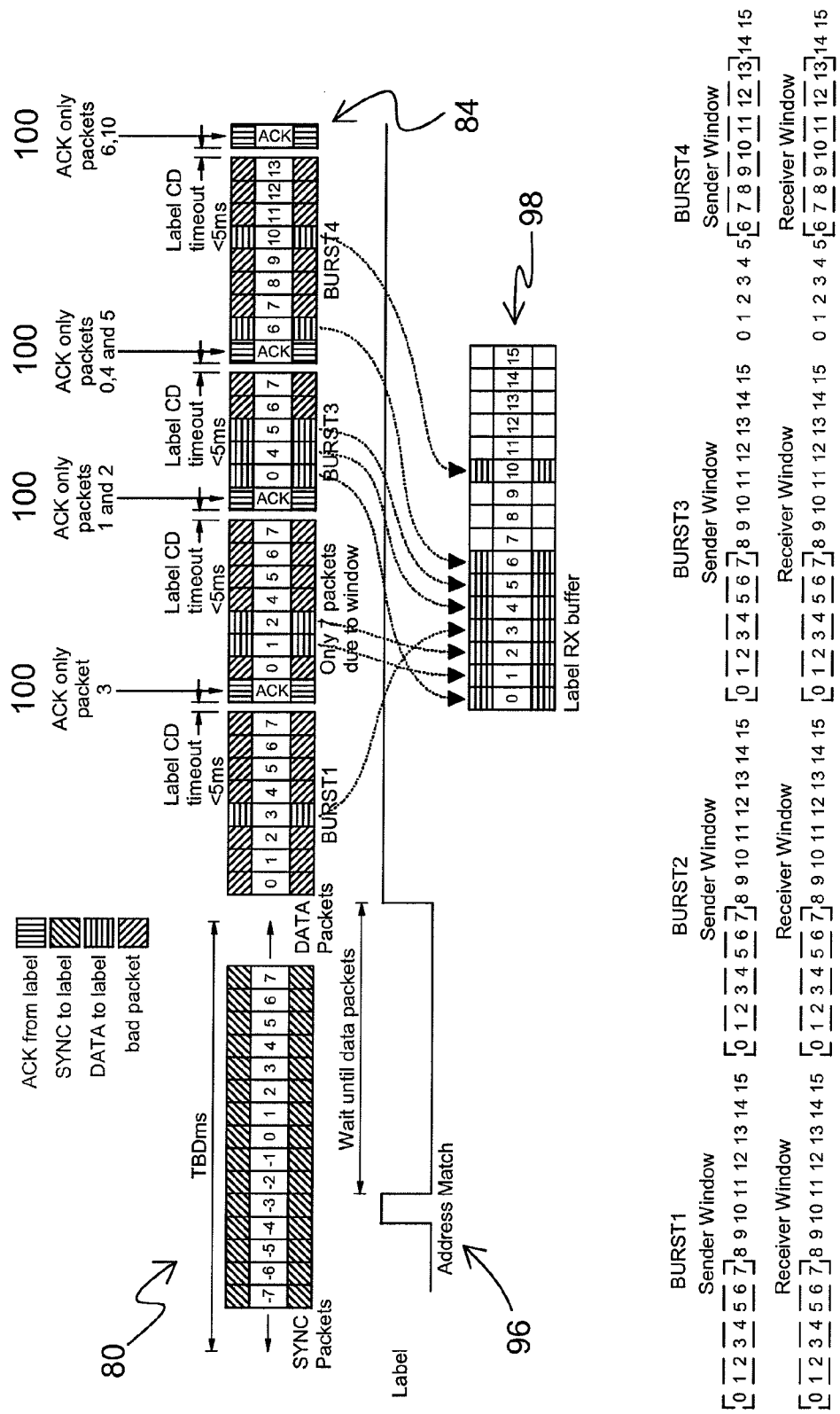
FIG. 9 is a schematic timing diagram related to high BER.

FIGS. 7, 8 and 9 detail the start of a data transmission timeslot for varying BER. In this case it is assumed that no data is being returned from the display. Referring to FIGS. 7, 8 and 9 there is shown the series 80 of sync packets 82 forming the synchronisation component 74 of signal 70 from communications module 16 as well as a schematic indication of the status of the RF transceiver 56 in display module 18. The transceiver status 96 shows that when an address match is found from the series 80 of sync packets the module 18 goes into receive mode during the date of transfer or payload stage of element 72 and receives data in bursts of 8 packets 86 within series 84 of data packets 86. The contents stored in the display module memory such as a buffer are shown at 98. An acknowledgment packet 100 is returned to the communications module 16. In FIG. 7 with a low bit error rate, the acknowledgment packet 100 acknowledges receipt of all preceding 8 packets as a single. Whereas a for a medium bit lower rate the acknowledgment packet 100 requests a repeat of a corrupt packet such as packet 3 which data packets is then re-sent. In the event of a high bit error, the display module 18 is adapted to acknowledge individual packets which have successfully been received and stored to the local memory or buffer and hence a standard sliding protocol is carried out.

Figure 10:
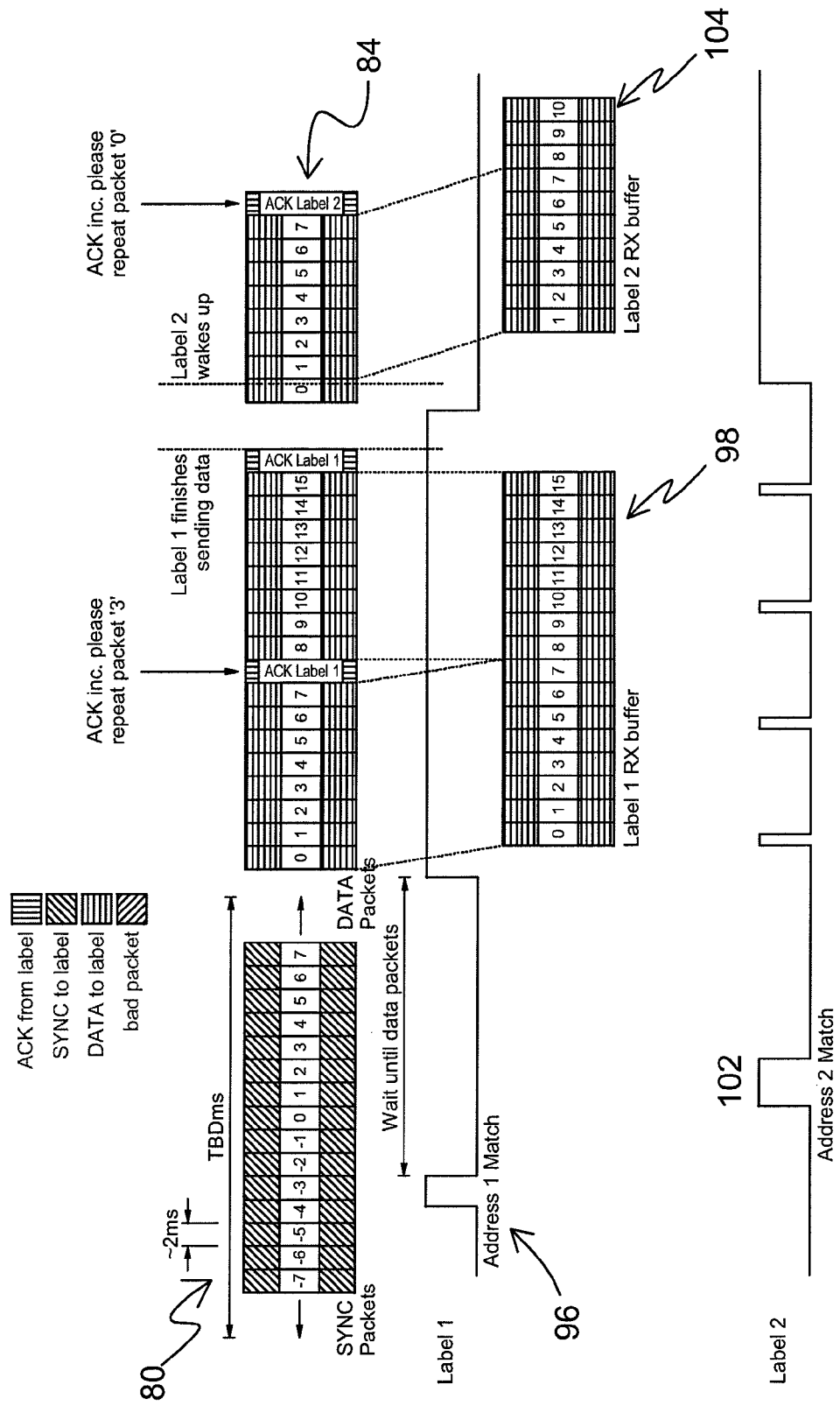
FIG. 10 is schematic diagram of timing sequences showing data transfer to a record display module.

To increase the utilisation of the data channel, the communications module 16 can queue two displays up for data transmission in a timeslot. FIG. 10 shows this process. The display that is second in the list wakes up periodically to check to see if data packets are still being sent for the primary display.

When the communications module 16 has finished transmitting packets to the primary display module 18 and the display module 18 response has been received data is immediately sent to the second display module 18 in the list. This is to prevent another system grabbing the channel. These packets 86 are repeated, with 4.75 ms gap between bursts.

The secondary display module 18 wakes-up at some point during one of these bursts, see line 102 in FIG. 10, send an acknowledgement, and then commence a standard data transmission. It can identify the end of a data burst by either scanning the control bits of that packet or detecting the short period where there is no data being transmitted. Data is stored to local buffer 104 as shown in FIG. 10

Return Data Packets

Figure 11:
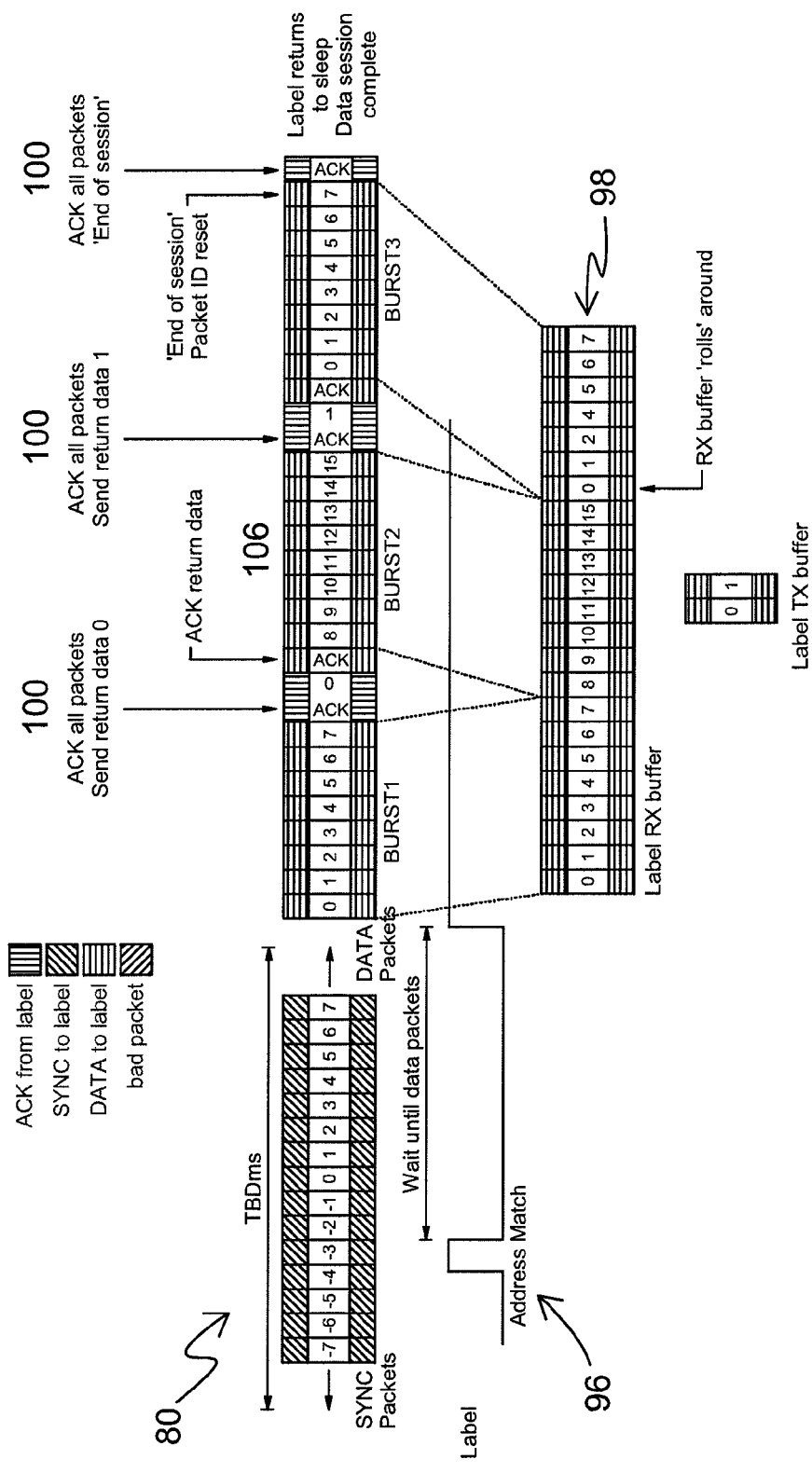
FIG. 11 is a schematic diagram of timing sequences regarding transfer of data from a display module to a communication module.

Return data packets 106 are 'piggy-backed' onto returned acknowledgements. FIG. 11 assumes variable length data packets. In this case the first three data bytes are the acknowledgment and the following (optional) four data bytes the payload.

If there is data queued up in the display transmission buffer it is sent back during the next acknowledgment packet. This data packet is then acknowledged by the communications module 16. There is no sliding window protocol for this return path. Out of order packets will generate a 'BAD' and terminate the current communication session.

If an acknowledgement is not sent from the communications module 16 to the display the data is resent during the next display to communications module 16 acknowledgment period.

Initial Synchronisation and Re-Synchronisation procedure

If a display module 18 is not in sync with the communications module 16 it is required to re-synchronise with the polling interval of the transmitter (communications module 16). The requirement to resynchronise happens through one of four ways: communications module 16 is no longer transmitting sync packets, communications module 16 is no longer transmitting sync packets on the relevant frequency, the polling period of the display module 18 is out of tolerance (i.e. beyond the period of the sync pulse 74 to receive a valid data packet 82), and or after the initial set-up when the display module 18 is attempting to locate a valid communications module 16.

The display module 18 initially attempts to scan the first frequency in the list. The scan consists of waking up and carrying out a carrier detect or CD scan on that frequency channel. If there is no carrier the display module 16 goes back to sleep for a period of time just shorter than the sync packet burst length. If the display module 18 detects a carrier signal it then stays awake for 2 sync packets 82 and attempts to process the data. If it fails it assumes that it has woken up during a data packet, so goes back to sleep for just shorter than the sync packet burst length.

If a valid sync packet 82 is processed, then the display module 18 knows which timeslot that sync packet 82 is associated with and the time offset in the sync packet burst. This enables it to sleep until the next polling period, at which time the display module 18 enters its normal operation regime.

If the display module 18 fails to locate a valid sync packet 82 on the primary frequency after a programmable number of complete cycles, say more than 8 it attempts to locate the synchronisation pulses on the alternative frequencies that were programmed during the initial set-up.

This is carried out in a similar way to scanning on one frequency. However the display stays awake for a slightly longer period as it carries out a CD on all the frequencies in the list each time it wakes up.

If the display module 18 fails to synchronise with a communications module 16 at this point it will go to sleep for an extended period of time such as 15 seconds before attempting to locate a communications module 16 again. This extends battery life and provides for the case were the unit has been put into storage.

Group Addressing

There are two aspects of group addressing, firstly allocating displays to a group, and secondly transmitting data to that group.

Allocating Displays

There are two methods for allocating a display to a specific group:

Single Allocation (Acknowledged): The communications module 16 wakes the display module 18 as normal, but one of the data packets has a command bit set, and a command subsequently transmitted assigning the module to a group id. These packets are acknowledged as per the normal data transfer protocol.

Group Allocation (not acknowledged). This allows a communications module 16 to allocate a set of display modules 18 in a polling group simultaneously. After sending a SYNC packet 82 with specific commands such as a Display Address 1 field set of a predetermined form and a Display Address 2 field set to another predetermined form all the displays in that polling group will wake up and process packets. The communications module 16 then sends data packets with a predetermined structure anticipated by the display modules, thereby to enable a group of the display modules to be assigned through a single data transfer being received and processed by all display modules in the group.

Transmitting Data to a Group

When the communications module 16 wishes to communicate with a group of displays it transmits a series of special synchronisation packets. These have the Address 1 field set in a predetermined manner and Address 2 field set to the group that the communications module 16 wishes to communicate with. At this point data is streamed to all the displays in the associated group, albeit without ACK packets being returned. The transmitted packet ID is preferably incremented with each packet transmitted as it is up to the display module 18 to determine if it has received corrupt data.

If Display Address 1 was set to 0xFFFF, and Display Address 2 to 0x0001 the next data packets would be destined for labels in group 1 only. It is important to note that this is different to the timeslot grouping (based on the LSB of the display address). It may be necessary to repeat the process several times for different timeslots to ensure that all the displays are updated. A Group Address eg 0x0000 can be reserved and used as a broadcast address to all displays.

Preferably a SYNC packet is generated having a data structure similar to that described earlier containing information identifying the length of the data packets to be transferred, the number of synchronised packets in the SYNC packet burst and/or the number of remaining SYNC packets as well as address information regarding the group of displays being addressed for example through the first display address and second display address. Preferably information is also provided regarding the time slot identification that the SYNC burst is aimed at. Preferably a data packet is transferred between the base station and display comprising relevant address information and sequencing information regarding the relevant data packet within a given data packet burst. For example a data packet might comprise 480 bits including a command element, a "packets remaining" element and the actual data (which might for example be in the order of 472 bits). The command byte might comprise a command bit, start session, and start time slot, and end session, and a packet ID. Preferably a data packet is generated by the display back to the base station comprising an acknowledgment packet again comprising relevant information regarding addresses, time slots and so on as well as a data packet which itself can comprise a command byte and/or returned data. In particular, the display is adapted to acknowledge successfully received data and request further data which might have been corrupted, in a manner such as described earlier.

In the event that an unrecoverable link error has occurred display 18 preferably times out and goes to sleep which information is passed back to the communications module 16.

Reprogramming Displays

At least every 15 s, at a convenient point, the display sets a predetermined address, such as its H/W address, a predetermined value such as to 0x00 and scans the control frequency utilising a predetermined protocol. This is likely to occur between sync pulse components 74 while the display is not communicating with the communications module 16. This is to enable easy re-programming of the display.

Multiple Communications Modules 16

Multiple communications modules 16 are handled with this system 10 through allocating the additional transmitters in the store to different frequencies.

Displays will associated with any valid communications module 16 that they find with a matching network ID on any of the frequencies that were downloaded during the initial configuration step.

It is up to the PC application software to attempt to communicate with the displays utilising the different communications modules 16 in turn. Once a display has successfully been sent data via one of the communications module 16s it will be considered the primary transmitter for that device.

Display Network Management Module 22

The display network management module 22 consists of a database, an application programming interface for database 20 and a graphical user interface.

Database 20

The database 20 is shared between the communicator 12 and the display network management module 22. The database 20 contains information on what display modules 18 are associated to products, display module statistical information, product images, command and status queues and audit log tables.

Application Programming Interface (API)

The API consists of software that provides the main interface between third party applications and the communications system. A comprehensive library of commands is available within the API to enable a third party application, such as the image rendering module 28 to associate images to products and to push image updates to display modules 18. The API also provides functions for managing the creation and deletion of products, the association of display modules 18 to products and the retrieval of status and statistical information.

During a system 10 setup phase the API is used to create products and display modules within the database 20. After these have been created the API is then used to associate a display module 18 (or multiple display modules) to a product. Once this association has been performed the API ensures that whenever a product update call is made, the appropriate display modules associated to the product are sent an image update.

After a system 10 has been setup the API is called whenever the image rendering module 28 has new images for products. On receipt of an image update call the API validates the size and format of the image before placing the display module updates onto the communicator service queue for transmission to the display modules 18 associated with the product. The API waits for a response from the communicator service and return this to the calling application. The API also handles update retries if a failure is detected.

Graphical User Interface (GUI)

The GUI consists of a software application that provides a means for a user to setup and configure the API and database 20.

The GUI provides a means for creating and deleting products and display modules, associating display modules to products and for displaying usage statistics and audit information in a graphical format.

Product Rules Engine 26

The product rules engine 26 consists of a software application that manages the product updates and presents a user interface to show update statistics and status information.

Figure 14:
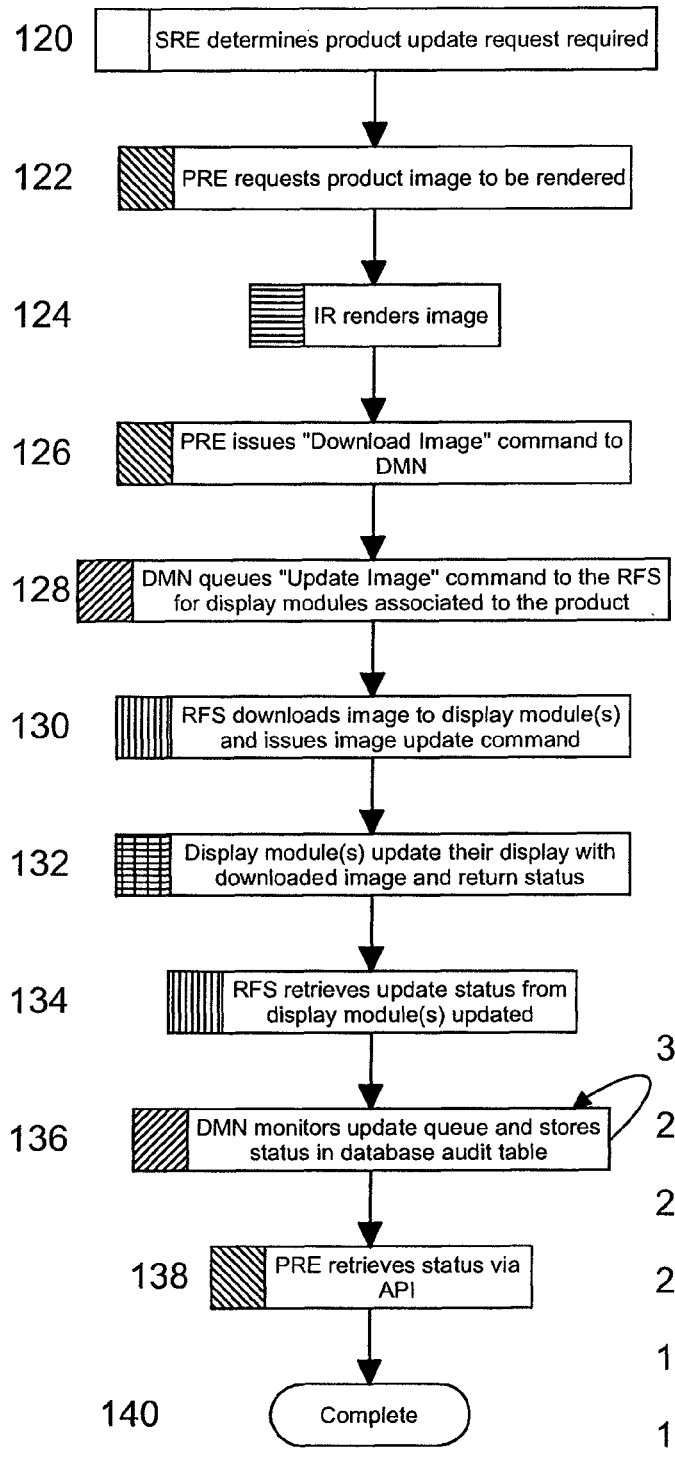
FIG. 14 is schematic flow diagram of an immediate and/or standard update process.

When the system rules engine 34 determines that a new image is required for a product it schedules the product rules engine 26 to run. The product rules engine 26 retrieves the product data from the system rules engine database 38 and schedules the Image Renderer 28 to generate a new image for the product. This is shown in steps 120 to 124 of FIG. 14.

Once the image has been rendered a product update command containing the new image is issued via the API to the display network management module 22. The image is then transmitted to the appropriate display module(s) 18 and displayed as shown at steps 132. Further, the communicator 12 retrieves update status from display units 18 as shown at step 134 and display network management module 22 monitors updates queues and stores status in a database in an audit table shown at step 136. This cycle is repeated to maintain a complete database audit table and periodically the product rules engine 138 retrieve status via the API until this process is completed shown in step 140 of FIG. 14.

Figure 15:
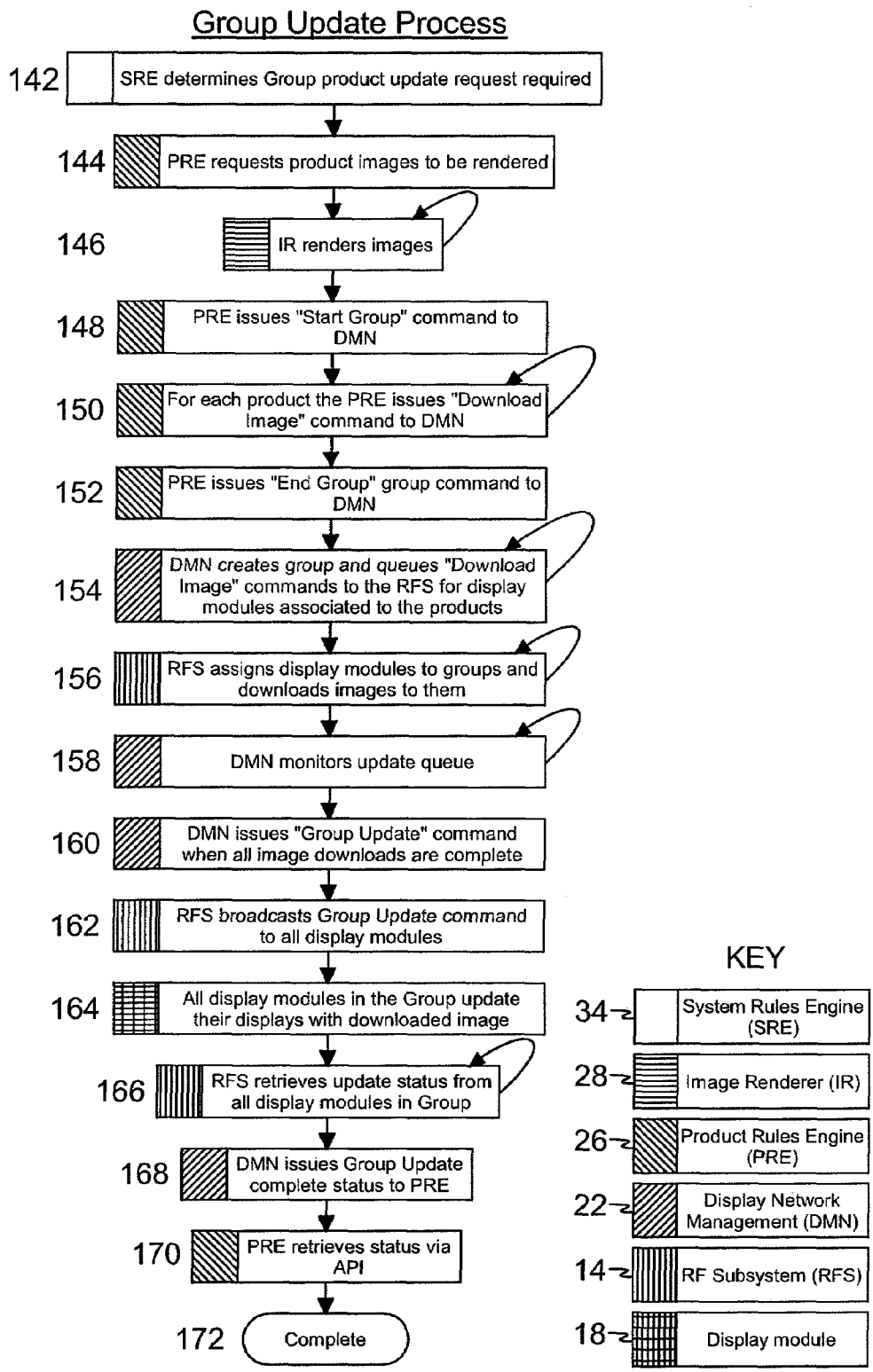
FIG. 15 is a schematic flow diagram of a group update process.

Referring to FIG. 15 there is shown a Group Update Process wherein the Business Rule Engine 34 determines if a group product update request is required as shown at step 142. For example a group of displays modules 18 might be grouped according to proximity and/or product type and require a group update so that the display image is changed (see later discussion in this regard). At step 144 the product rules engine request product images to be rendered and the image renderer 28 renders the images as appropriate at step 146. The product rules engine 26 issues a "start/endgroup" command to the display network management module 22 and for each product the product rules engine 26 issues a download image command to the display network management module 22. The product rules engine 26 further issues an end group group command to the display network management and the DNM 22 creates groups and queues downloads image commands for the communicator 12 for displays 18 associated with the products within the group as shown as step 154. The communicator 12 assigns displays to groups and downloads images for them and the DNM 22 monitors the update queue as shown in step 158 in FIG. 15. The DNM 22 further issues a group update commands for all image downloads are complete and the communicator broadcasts the group update command to all displays 18 as shown in step 162. All displays in the group update their displays with downloaded images as indicated at step 164 and the communicator 12 retrieves update status from the displays 18 within the group. The DNM 22 which issues a complete group update status to the product rules engine 26 and the product rules engine retrieves status via the API as shown as step 170.

Figure 16:
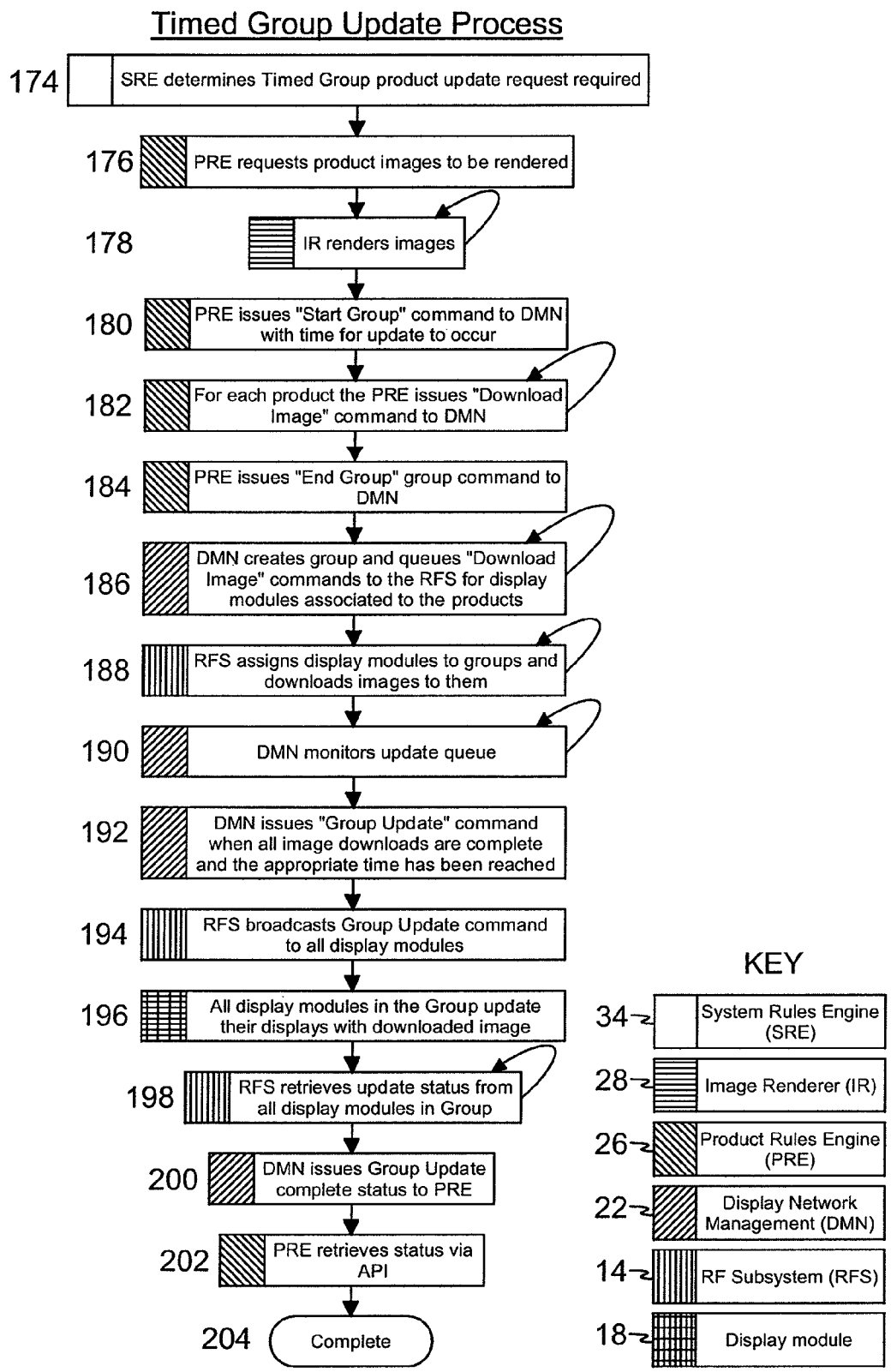
FIG. 16 is a schematic flow diagram of a timed group update process.

For a timed group update, the process is shown in FIG. 16 wherein the system rules engine 34 determines a timed group product update request is required as shown at step 174 and the product rules engine 26 requests product images to be rendered by the image renderer 28. The product rules engine 26 further issues a start group command to the DNM 22 with a time for update to occur as shown at step 180. For each product the product rules engine 26 issues a download image command to the DNM 22. The PRE 26 further issues an end group command to the DNM 22 as shown at step 184. The DNM 22 creates groups and queues and downloads image commands to the communicator 12 for displays 18 associated with the products in the relevant groups as shown at step 186. The communicator 12 assigns displays 18 to groups and downloads images to them and the DNM 22 monitors the update queue. Various of these steps are repeated as shown in FIG. 16 in order to ensure that all images are rendered and all updates transmitted through to the relevant displays 18. The DNM 22 then issues a group update command when all image downloads are complete and the appropriate time has been reached as indicated at step 190. The communicator 12 then broadcasts the command to all displays 18 and the displays update the displays with downloaded images as shown at step 194. The communicator 12 retrieves update status from all the displays 18 in the group and the DNM 22 issues a group update complete status to the PRE 26.

Figure 17:
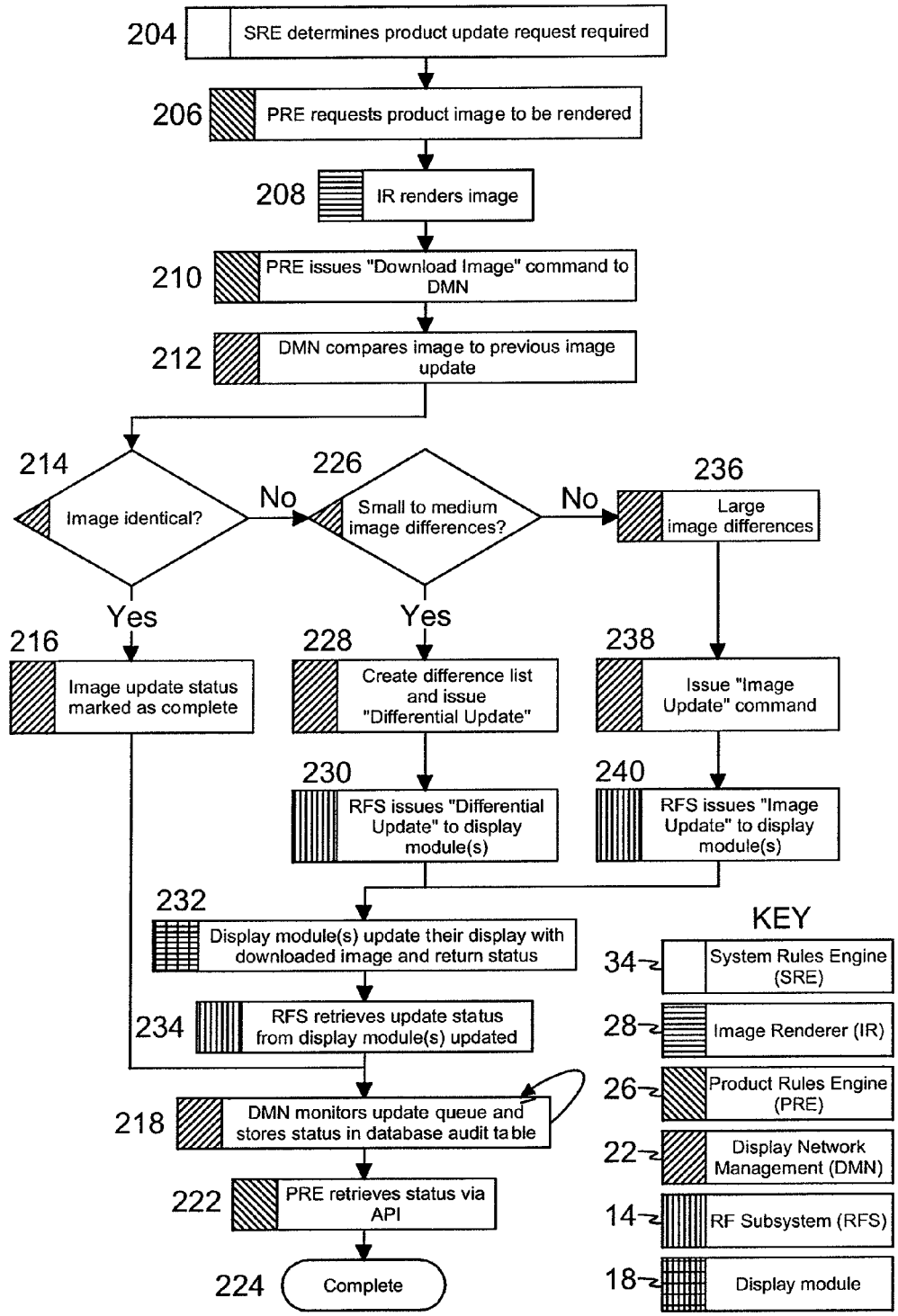
FIG. 17 is a schematic flow diagram of a differential image update process.

Referring to FIG. 17 there is shown a flow process for providing differential image update. Again, the SRE 34 determines the product update request as required at step 214 and product rules engine 26 request product images to be rendered by the image renderer 28. The product rules engine 26 issues download image commands to the DNM 22 and the DNM compares images to previous image update as shown at step 212. If the images are identical the DMM 22 marks the image update status as complete and monitors the update queue and stores status in a database audit table as shown at step 218 product rules engine 26 approves status via the API and the process is complete as shown at step 224. However, at step 214 if the images are not identical then the DNM 22 queries if the differences in image are small to medium. If small to medium, the DNM 22 creates a difference list and issues a differential update command as shown at step 228. The communicator 12 then issues differential update to the displays 18. Subsequently the displays 18 update their display with downloaded images and return status information as shown at step 232. The communicator 12 retrieves updated status from displays 18 and informs the DNM 22 and PRE 26 accordingly.

If at step 226 the image differences are not small to medium then as shown at step 236 the image differences are shown to be large at this stage and the DNM 22 issues an image update demand 238 such that the communicator 12 issues an image update to relevant displays 18 as shown at step 240

At step 232 a display 18 updates its display with a downloaded image and returns the status to Communicator 12 and in turn the DNM 22 and PRE 26 are informed accordingly.

Figure 18:
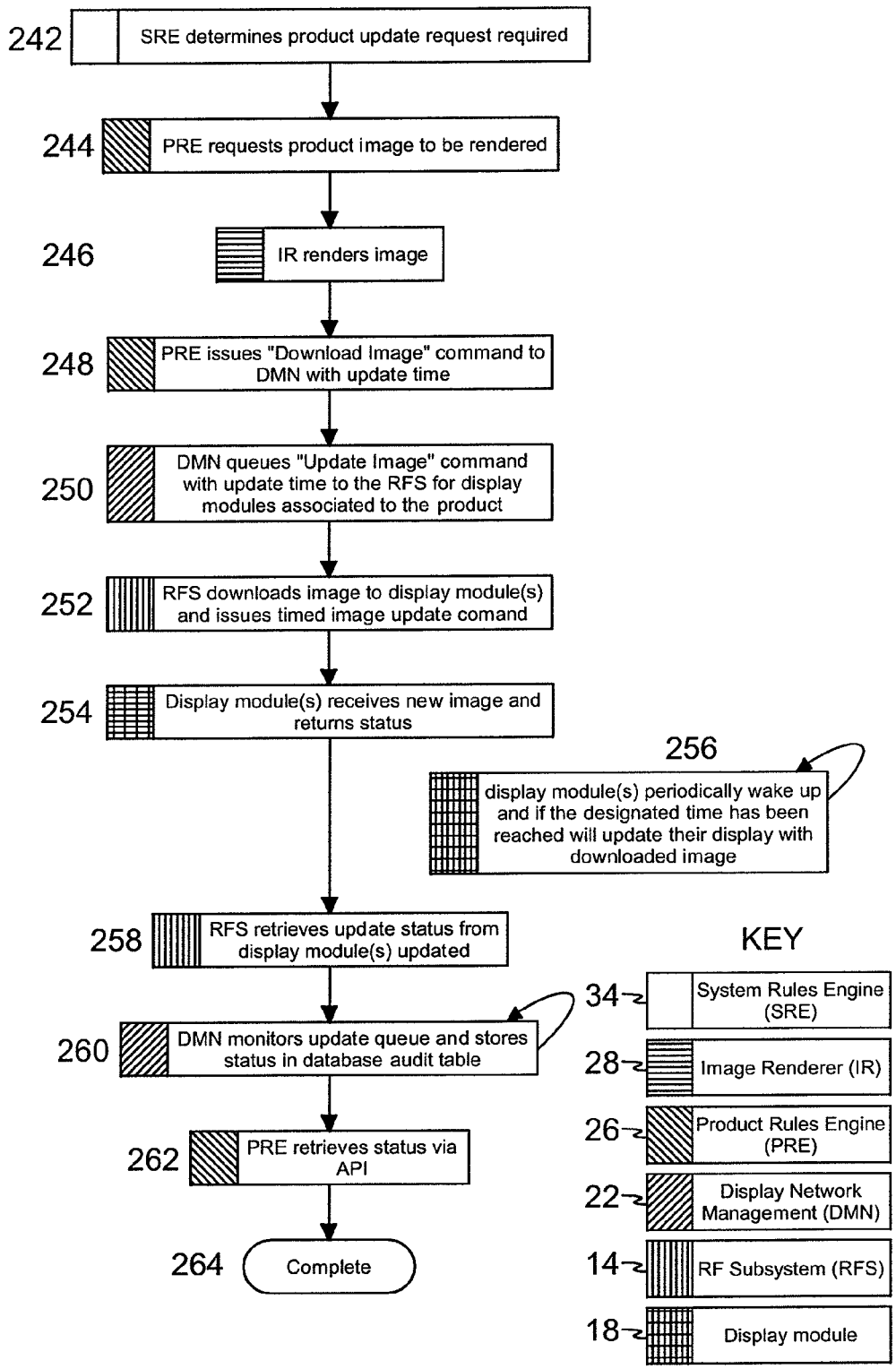
FIG. 18 is a schematic flow diagram of a display module timed image update process.

FIG. 18 provides details of further process of updating the image on a display 18. Here the SRE 34 determines a product update request as required as shown at step 242. The PRE 26 requests product image to be rendered and image renderer 28 renders the image. Again, the PRE 26 issues a download image command to the DNM 22 with an update time. The DNM 22 queues the image update command with the update time to the communicator 12 for the display 18 associated with the product.

The communicator 12 downloads the image to the display 18 and issues timed image update command as shown at step 252. The display 18 receives the new image and return status at 254. Periodically display 18 wakes up and if the designated time has been reached will update the display with downloaded image information as shown at step 252.

The communicator 12 retrieves updated status from the display 18 and again the DNM 22 and PRE 26 are informed accordingly before the process is complete at step 264.

Image Rendering Module

The image rendering module consists of a template designer 32 and an image renderer 28.

Template Designer 32

The template designer 32 consists of a software application that provides a user with a means to create a template 30 design for an display module 18. The template 30 allows the layout of different graphical elements that make up the display module image and defines a set of rules for how the graphic elements are applied to the image.

The template designer 32 presents the user with a menu of data elements that are provided from the output of the System rules engine. These data elements can then be applied to an image and further rules can be set up to define the font, font size, layout position and other formatting information Image Renderer 28

The image renderer 28 consists of a software application that is scheduled to run by the product rules engine 26 and renders display module images based on image templates 30 created using the template designer 32.

The application uses data supplied by the system rules engine 34 and formats the information according to the rules supplied in an associated template to output a product image suitable for transmission to a display module 18.

System Rules Engine 34

The system rules engine 34 in one form is a software application that performs a number of specific tasks to ensure that display module devices display the correct images. The Rules Engine performs the following operations:

Merging from multiple disparate data sources into a single output destination.

Applying event or condition calculations on data sources to create a single "derived" data element output.

Using information from data sources to define how data elements can be applied and deployed on the output destination.

Using "listeners" to examine data states, waiting for predefined conditions to occur, and then creating execution actions in response to the validated conditions.

The user defines any number of the above operations to monitor their data sources and initiate events based on the content of the manipulated data. The events would normally, but are not restricted to, result in the image renderer 28 generating new images for products and issuing image update commands to the API.

Examples of what the system rules engine 34 can be used to perform are:

The creation of display module images that relate data from one product to another i.e. cross selling Product price promotions using rules to reduce the standard price of products by specific amounts and causing the image renderer to use alternate image templates to promote the reductions.

Product price changes based on the level of stock inventory. Rules can be set up to monitor a retailer's inventory database and indicate relevant stock levels to customers. Rules can also make price changes based on the level of stock held at a store or cross refer customers to alternate products if out of stock.

Sweeping the Web 40 and interrogating competitor pricing. Automatically adjusting in store product information in real time to display those competitor prices to highlight that the best price can be achieved in store.

Automatically updating pricing information according to the time remaining to a "sell-by" date.

Automatically updating pricing information according to stock level and rate of change of stock level.

Figure 19:
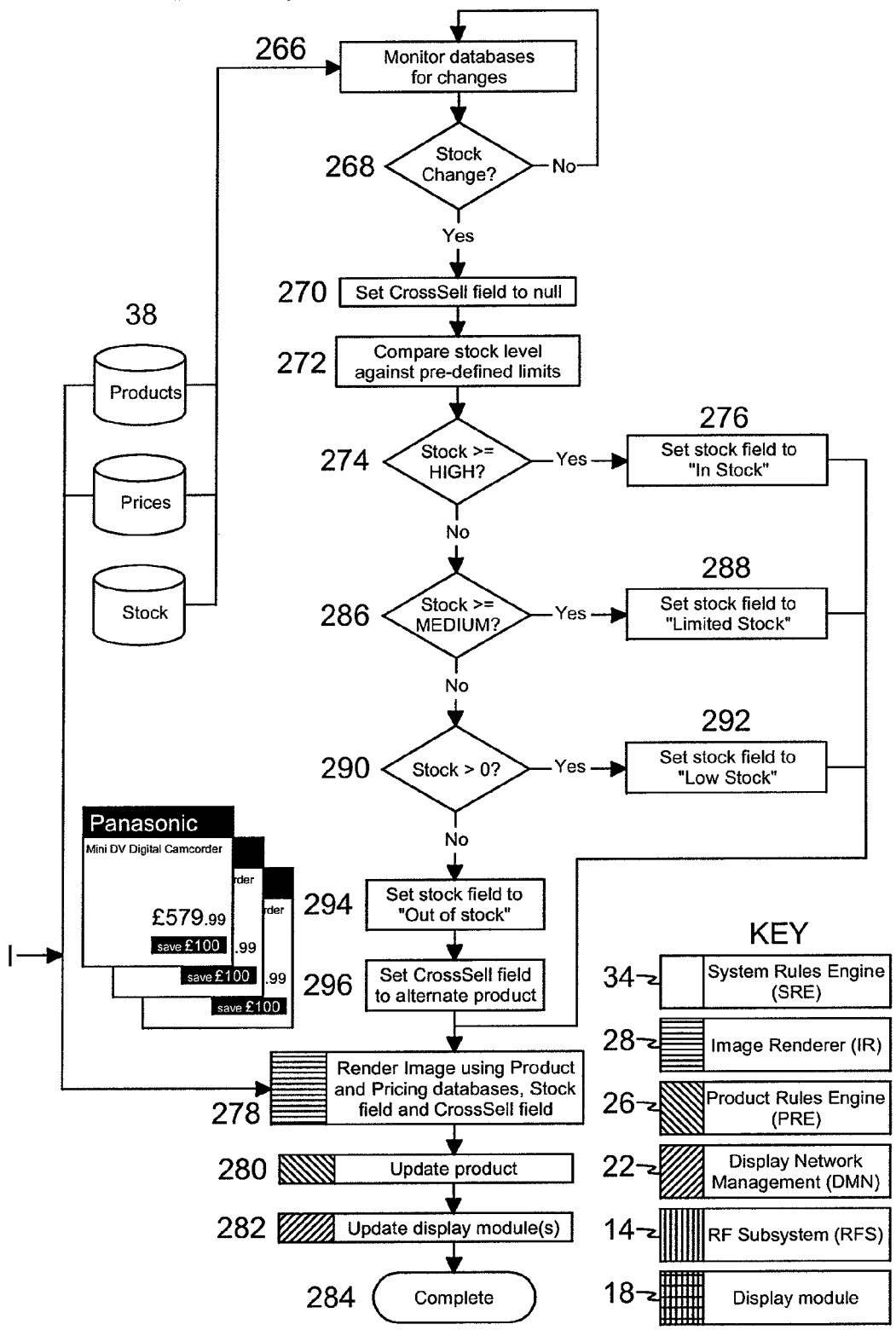
FIG. 19 is a schematic flow diagram of an inventory control business rules example.

Referring to FIG. 19 there is shown how the business rules can maintain using inventory control system. Here the System rules engine (SRE 34) monitors the Databases 38 including product price and stock information as shown at step 226.

The SRE 34 enquires about stock change at step 268 and in the event of no change continues to monitor the databases 38 and loop through the enquiry process. However, in the event of a change in stock, the system rules engine 34 sets a cross cell field to null as shown at step 270 and compares the stock level against predetermined limits as shown at step 272. At enquiry step 274, if the stock is greater than or equal to a predetermined high limit, then the set stock field is set to "in stock" as shown at step 276 and the Image Renderer 28 can create an image based on product and pricing database information stock field and the cross cell field drawing data from the appropriate convention databases 38 thereby to generate an image as shown at Image I in FIG. 19. The product rules engine 26 then goes through a product update in order to ensure that the new images are displayed on the relevant Display Module 18.

In the event that the stock is determined to be greater than or equal to a predetermined "medium" stock level as shown at enquiry stage 286 then the stock field is set to "limited" stock as shown at step 288 and the process from step 278 as described above is then continued.

At the further enquiry step 219 if the stock is not deemed high or medium the business rule engine SRE 34 enquires if the stock is greater that 0, if yes the stock field set 2 "low stock" and the appropriate image created using the image renderer 28 and product rules engine 26.

However, if in fact it is determined that there is 0 stock at step 290 then the stock field set is set to "out of stock" and the cross cell field is set to an alternate product as shown at step 296. The image renderer 28 then creates an appropriate image for the relevant product as shown at step 278.

Display Module 18 Timed Update.

Display module 18 timed updates provide an alternative method of achieving group updates. Using this method the display modules will perform the image update at a certain time, independent of the communicator 12 and display network module. This removes the need for a Group update broadcast. As shown in FIG. 18.

Multi-Display Module

Figure 20:
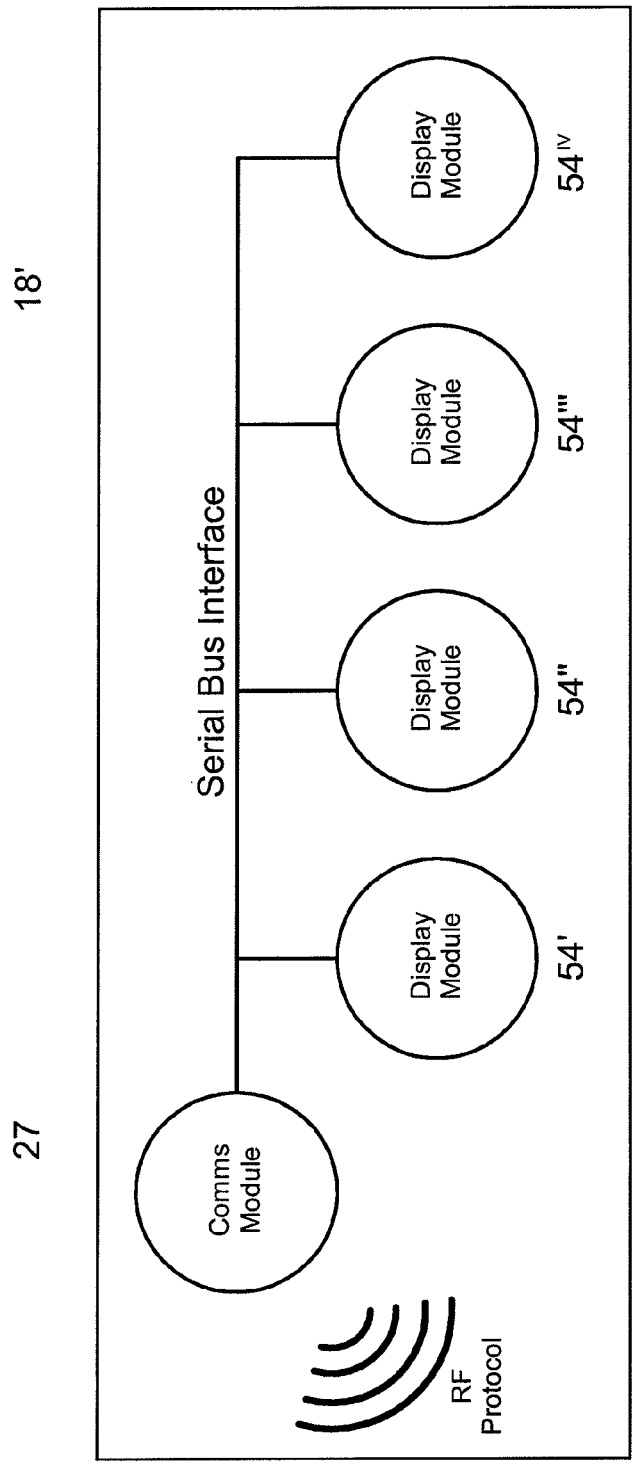
FIG. 20 is a schematic block diagram of a display communications module comprising multiple displays.
Figure 21:
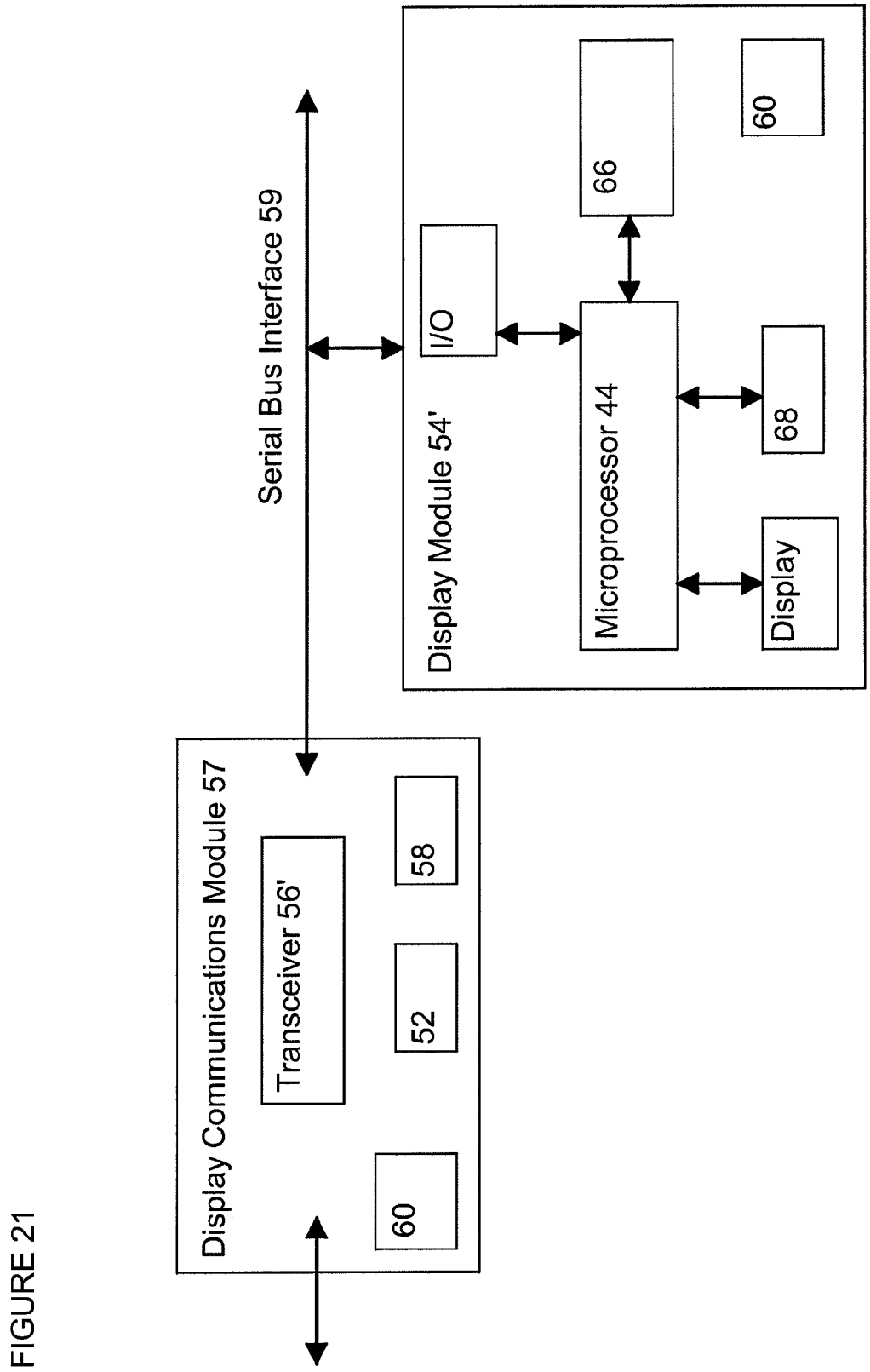
FIG. 21 is a schematic block diagram of components of a display communications module and multiple display as shown in FIG. 20.

Referring to FIG. 20 there is shown how a combination of a single display communications module 57 and multiple displays $54^i$, $54^{ii}$, $54^{iii}$, $54^{iv}$ which are brought together to create a shelf edge system that: provides a simple and effective way of updating multiple displays along a shelf edge, and reduces the overall system cost of a shelf edge solution by sharing a single communications module.

Display Communications Module 57

The display communications module 57 consists of a microcontroller 52', an RF transceiver 56', a serial bus interface 59 and a power supply 60'. A single display communications module 57 is shared amongst multiple displays 54, providing the data required to update each display 54.

The display communications module 57 contains a microcontroller 52' that runs a software application to interface via the communication protocol with a communications module 16. It receives commands and data from the communicator 12 and processes the commands, returning acknowledgements when they are complete for each of displays $54^i$ to $54^{iv}$.

When processing an update command the microcontroller 52' selects the appropriate display 54 (based on the address provided in the command), applies power and issues the command and data to the display 54' via the serial bus interface 59. Once the command is complete the microcontroller 52' powers down the display 54 and return an acknowledgement to the communicator 12 via the RF transceiver 56'.

Display 54'

The display module 54' consists of an LCD Display, an integrated IC containing a Serial Bus Interface, a voltage conversion module, a temperature sensor and the LCD update algorithm.

When idle the Display 54' is in a low power standby mode. The display 54' only powers-up when individually addressed to ensure that the minimum of power is used.

When an update command is received over the Serial Bus Interface 59 from the display communications module 57 the Display Module powers up the temperature sensor 66' to take a reading and then use the value read to adjust the voltage conversion module to generate the required voltage for an update. The LCD update algorithm then applies the correct waveforms to update the display.

On completion of an update the Display then issues an acknowledgement over the Serial Bus Interface 59 and return to its very low power state.

The product 18' is designed to fit securely onto the edge of a shelf. The construction incorporates a single display communications module and multiple displays within it, providing a cost effective way of controlling a large number of displays. The product 18' is also powered from a single power, preferably battery source and designed such that only the display communications module is active in its normal standby mode; with the displays 54' only being powered when a display update is required.

Power Calculations

By way of evidence of the achievement of low power consumption using one or more of the features of the system and one or more steps of the methodology described above, the following power consumption data is provided. Here, a single battery is assumed to provide a total available energy of 1.53 Ah (i.e. approximately 90% of the batteries total capacity). The discharge of the battery will depend on temperature. For simplicity a constant 23 deg C. is assumed.

The power usage for each display module 18 consists of the following typical contributions shown in Table 1:

TABLE 1

| Power consumption in different modes of operation | | | | |
|---|---|---|---|---|
| Operation | Contributing factors | Energy/mJ | Ah per day at 5 updates per day and an 8.76 s frequency of SYNC pulse | Frequency |
| Standby | Standby current for all circuitry | $0.6 \times 10^{-6}$ | $45 \times 10^{-6}$ | Throughout day during polling off periods. |
| Power during SYNC pulse | Microcontroller, RF circuitry | 0.148 | $447 \times 10^{-6}$ | During polling on duration i.e. for each sync pulse |
| Wake up | Microcontroller. Flash memory erase and write, RF listen mode | 161 | $246 \times 10^{-6}$ | Each time an image is written to the flash memory. |
| Display update | RF listen, Microcontroller, read from flash, | 110 | $153 \times 10^{-6}$ | Each time an image is written to the display |

TABLE 1-continued

Power consumption in different modes of operation

| Operation | Contributing factors | Energy/mJ | Ah per day at 5 updates per day and an 8.76 s frequency of SYNC pulse | Frequency |
|---|---|---|---|---|
| | DC-DC converter for display, display write. | | | |

The above is calculated for a 4" QVGA display unit that requires 5.7 mJ to update, together with an additional 18.3 mJ for the DC to DC converter required to provide the voltages required to drive the display. The row voltage was 30V, column voltage 5V and the DC-DC converter efficiency assumed to be 85% for these calculations. The effective load of the display unit is then 33 kΩ. The image update time for a 1-bit display was taken as the worst case (1.578 seconds per image) and the RF receive time was 6.373 s.

Figure 22:
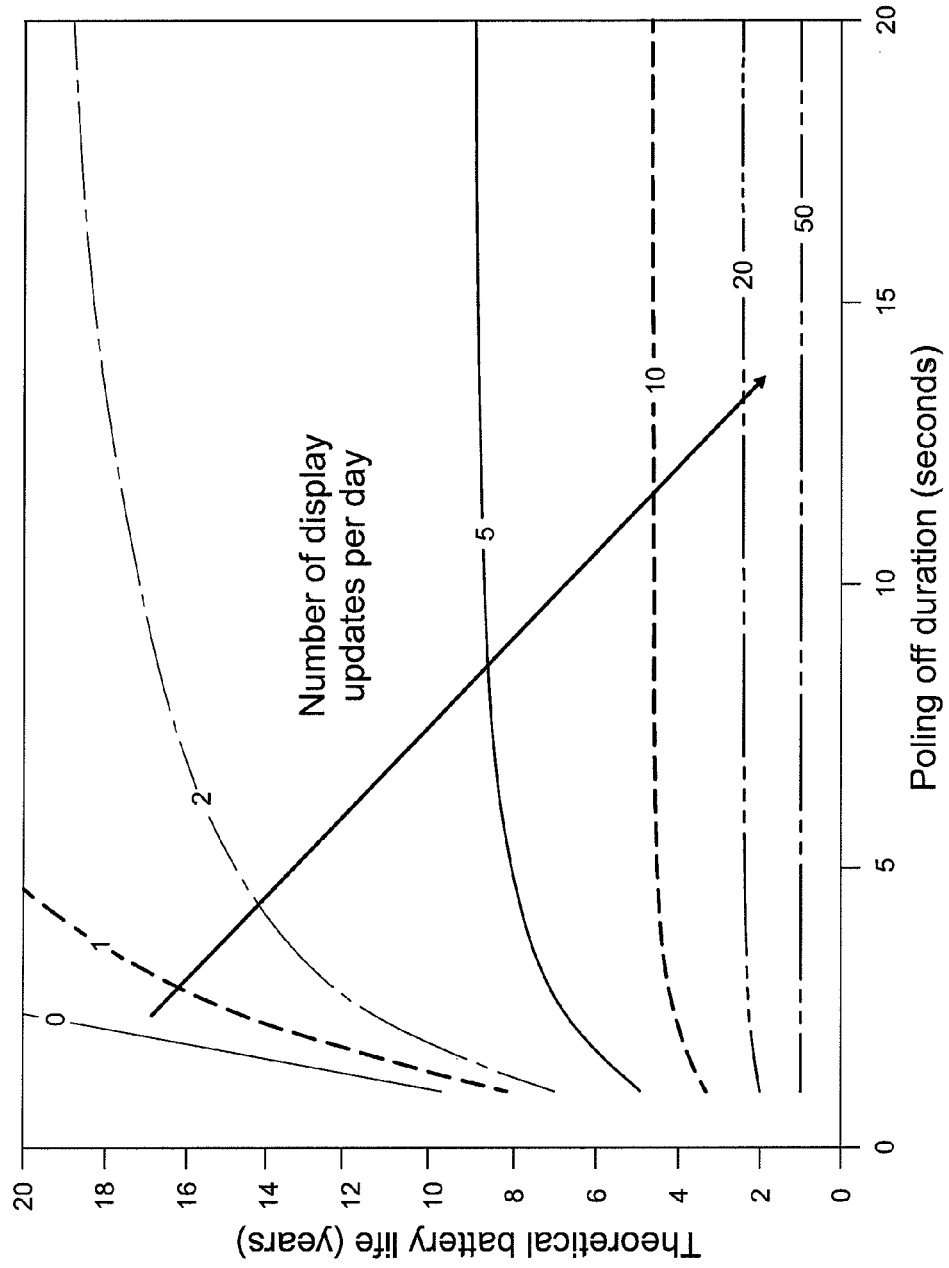
FIG. 22 is a graph of theoretical battery life versus polling off duration.

FIG. 22 is a graph that shows a theoretical calculation of battery life (in years) using the system of the current invention wherein the image is update several times each day (from 1 to 50 times).

Clearly, driving the display is a major contributor to the power: merely updating the image 50 times per day shows. This indicates how important it is to use a bistable display. If the display mode requires constant power, then even for the lowest power type of monostable or emissive type displays currently available, the battery lifetime would be measured in days at best.

Figure 23:
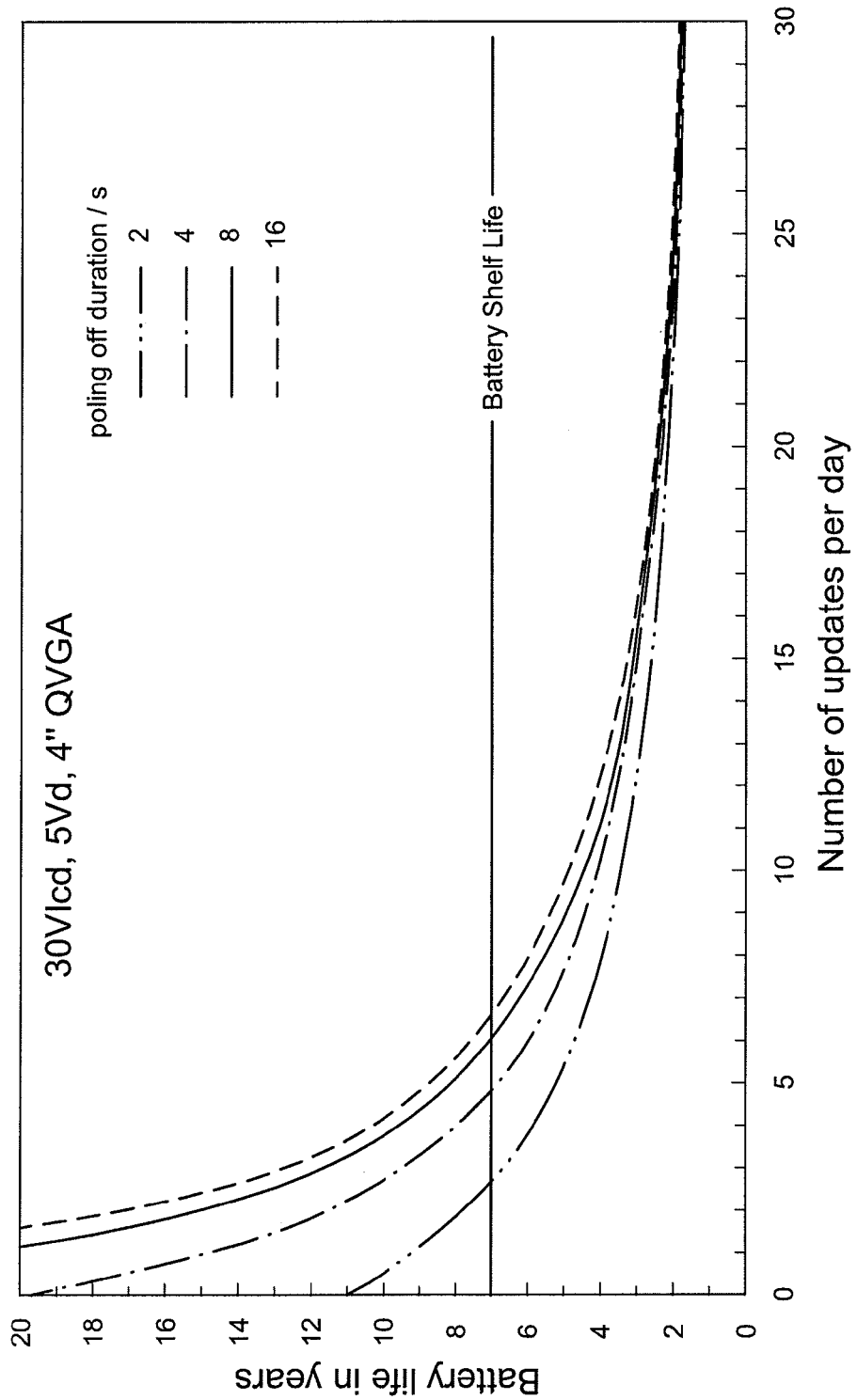
FIG. 23 is a graph of battery life in years versus number of update per day for a 4" QVGA display.

Typically for the retail application, the display will be updated between 2 and 5 times each day at most. For 5 updates per day, the theoretical lifetime of the battery is about 9 years if the polling off duration is about 20 seconds. Reducing the polling off period to about 8 seconds reduces the battery life by only 5% to about 8.5 years. Increasing the regularity of the polling period to once every 2 seconds begins to have a noticeable effect on the battery life, causing a significant 40% drop in lifetime. This is plotted in FIG. 23.

In practice battery lifetime will never attain the theoretical values found here, since shelf life of the battery is limited. For example, typical battery used for these calculations is found to have a 7 year shelf life. Hence, there is little point in optimising the polling off duration to extend battery life beyond this. For less than 6 image updates per day on average, therefore, the polling off duration is optimum between 4 and 8 seconds, preferably about 8 seconds.

In the retail application, there is a trade-off between the number of units that can be updated by a single communication device and the polling-off period. If a retailer is required to change say 1,000 labels, then this will probably be done over night. Typically, the retailer would need all of the labels to be updated in an 8 hour period. The time taken to update all of the labels will be dictated by the duration of the polling-off period. If 8 seconds, then 1,000 labels can be updated in series within 2.2 hours, which is satisfactory, whilst ensuring that the power usage is minimised.

Other applications may have a different use rate. For example, if the application includes the option to display pre-stored images loaded into the flash memory, and an interface for the viewer to toggle between these images, then a display may be updated 50 to 100 times per day. In these instances, there is no advantage to having a longer polling time (since power is independent of polling-off duration—see FIG. 22). The key for such applications is to minimise the power required to update the image and/or to maximise the energy available from the battery. For example, reducing the time taken to update the display, the display loading (capacitance and track resistance) and the voltages used are all effective measures for reducing the display energy consumption.

Figure 24:
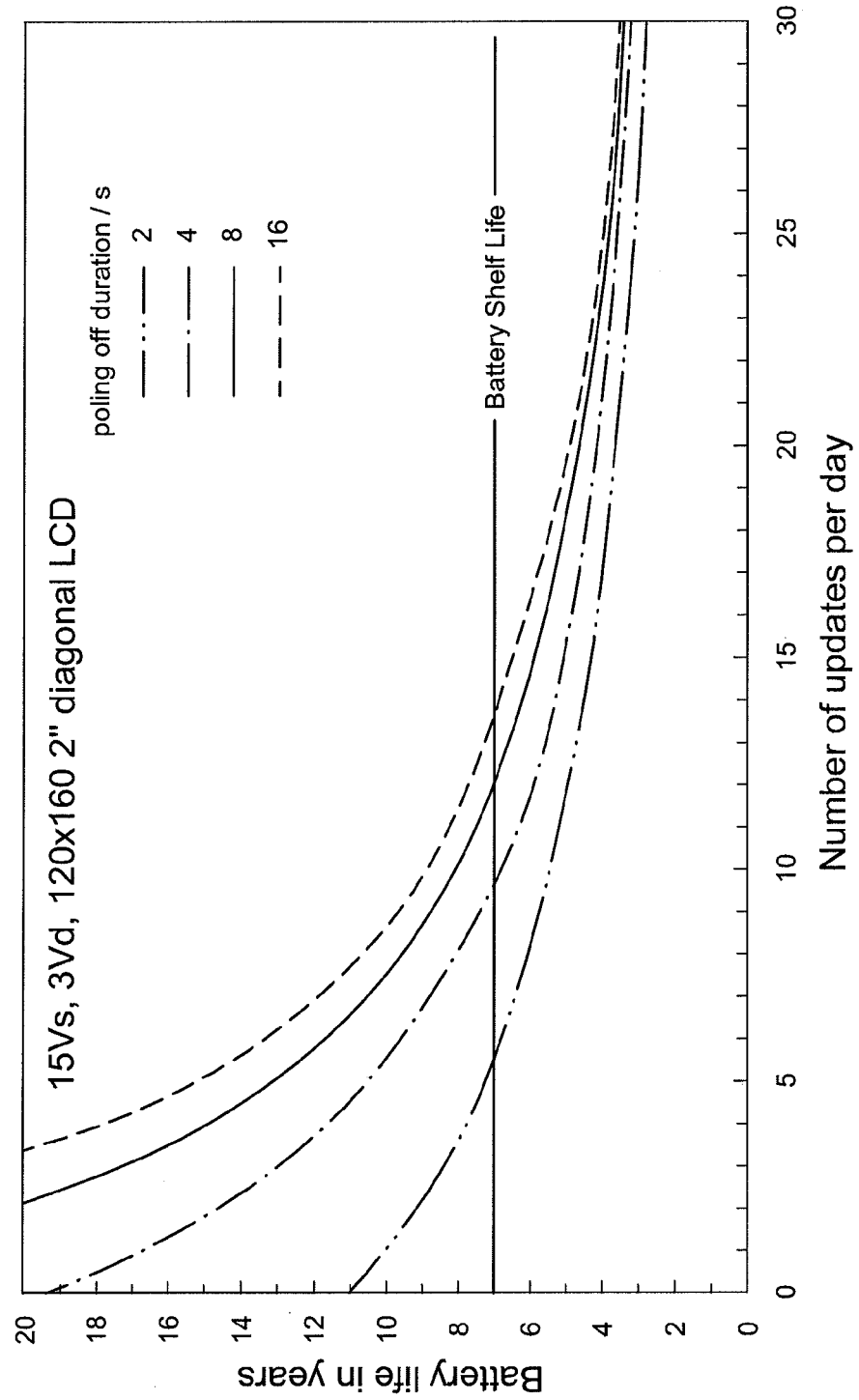
FIG. 24 is a graph of battery life in years versus number of updates per day for a 2" diagonal LCD.

The optimum SYNC or polling off period has also been calculated for a smaller display. Assuming that Vlcd=15V, Vd=3V and the effective load is only 15 kΩ to represent, say, a 2" diagonal 120×160 display device. The display update time is then taken to be 0.6 s and the RF receive time is taken for ¼ of the image content is 1.59 s. With the RF system of the current invention we then get the following relationship between battery life and polling off duration as shown in FIG. 24.

Obviously, due to the much smaller loading of the display and RF during the write period, a battery of this size (1.7 Ah total) will last considerably longer. The polling duration could readily be set to 2 seconds and a 5 to 7 year battery life still obtained for 5 updates per day. Alternatively, it is clear from this calculation that the same display may now be updated up to 15 times per day on average (with an 8 second SYNC period) whilst retaining the 5 to 7 year battery life.

There are other important design considerations to take into account when considering this smaller display device: namely cost and size. Usually, both of these considerations will be reduced. For example, 3 button-batteries could be used to supply the 1.7 Ah power to the 4" QVGA, whereas only 2 batteries could be fit behind the 2" diagonal smaller display. Thus, the energy available for the smaller display is close to 1.0 Ah in total. This means that the analysis of FIG. 24 tends towards that of FIG. 23. In this instance, the optimum SYNC period (polling-off duration) is again between 4 and 16 seconds, preferably close to 8 seconds.

In summary, the optimum polling-off duration (SYNC period) is related to the size and image content of the display, the number of updates required on average and the total energy available from the battery (accounting for its shelf life and effect of temperature and current drain). The optimum polling off duration is between 2 and 16 seconds: below 2 seconds the RF SYNC takes too much power, confining the display to minimal usage at best; above 16 seconds, the time taken to update a large number of displays becomes excessive for little extra benefit (due to the shelf life of the battery and relatively high magnitude of power then associated with the display update). In practice, 8 seconds is considered preferable.

Group Update

One aspect of the system is the use of group update to update several or all of the units simultaneously and in parallel. This is done using pre-stored images uploaded to each unit (display module 18) during the course of the day and stored in flash but not displayed until after a group update request is received by the unit.

Figure 25:
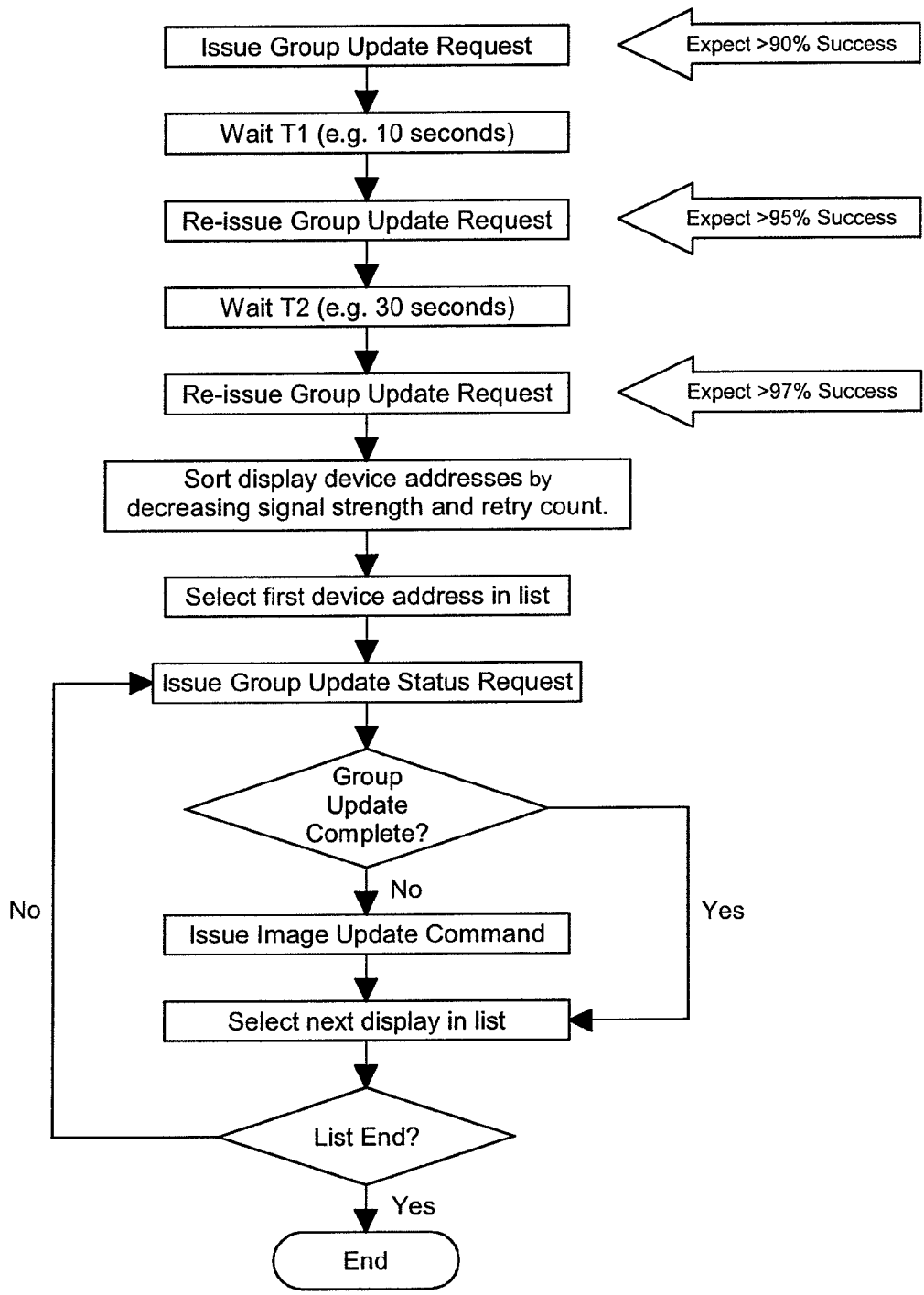
FIG. 25 is a flow diagram of steps in a group update procedure.

The procedure for the group update could be as shown in the flow diagram in FIG. 25 which is self-explanatory. It has been found in practice that some labels will not have a successful update on first attempt, because they have interference from within the environment, or are situated at a greater distance from the transmitter than the majority of the labels. To help maximise the number of labels that are updated, then the group update command is repeated say three times to minimise this loss.

In practice the system is found to give a 97% success rate for labels situated up to 100 m from the transmitter when operating in a typical supermarket. If the 3% loss is caused by random events (e.g. interference from customers) then repeating the group update would ensure a $100.(1-0.03^3)\%$ labels only are not updated correctly: that is 3 in a 100,000 displays.

In practice it is found that the loss is not random, and is more likely to happen for some labels than others. In this instance, the success rate of the second and third group updates is likely to be reduced. In such instances the displays will be updated serially in a conventional fashion following the group update. However, this can take some time. One aspect of the current invention minimises that time by choosing the sequence of the serial updates following a group update to begin with those units that are most frequently difficult to update and hence most likely to have failed the group update sequence. The software controlling the communicator system will have obtained information concerning which labels most frequently fail the serial update, due, for example, to the local environment of the individual units or the distance of certain units from the transmitter.

Other Functionality

In the retail sector the display system 10 can be adapted to provide one or more of the following functionality, especially using a computer adapted to drive a communicator to relay display data to a plurality of display modules positioned adjacent products in a retail outlet, the computer preferably having a data input from external data sources for example regarding product stock levels in a retail outlet, and being adapted to perform at least one of;

create display module images that relate data from one product to another product thereby enabling cross-selling of products;

perform product price promotion using rules to reduce the standard price of a product by a specific amount and causing use of an alternate image template for display by a display module to promote the reduction;

the computer operates rules established to monitor a retailer's inventory database and is adapted to indicate relevant stock levels to customers eg "Only XXX left in stock"; "IN STOCK" etc., and or make price changes to be displayed to customers based on the level of stock held at a store and or the rate of change of stock level, and or cross refer customers to alternate products if out of stock, and or display of sell-out notice e.g. swap to white text on black background with "SOLD OUT";

interrogate competitor pricing, such as via the internet, and preferably automatically to adjust the information displayed adjacent a store product, more preferably in real time, to display those competitor prices for example to highlight that the best price can be achieved in store;

automatically update pricing information according to the time remaining to a "sell-by" date for the product adjacent a display module;

display by a display module a special offer such as "Buy-one-get-one-free";

display by a display module detailed product information such as one or more of ingredients of an adjacent product, information about country of origin, free-trade, fat content, review comments (e.g. for wine), healthiness traffic lights, sell-by, use-by and best-by dates;

temperature monitoring using a temperature sensor associated with the display module, to enable the display module to assure customers of maximum temperature of freezer or chiller unit over a given period such as the previous days, preferably the display module incorporates a temperature sensor and is adapted to communicate the temperature information back to the communicator thereby enabling a warning of faulty temperature zones;

display by a display module of the date, hence enabling a reminder of the date for a user when comparing with the associated product "sell by date";

display by a display module of the time—preferably hours and minutes can be updated with every SYNC pulse and stored (not displayed since display does not wake up). Then when period to change SYNC period (poling-off duration) is reached, all displays will be able to reduce the SYNC period at the correct time, and re-increase it when complete;

display of a promotional colour, e.g. red-corner display wherein the image is automatically changed from black corner (no special offer) to a red corner (special offer applies);

tamper detection of a display module wherein the display module comprise a tamper evident sensor such as a tilt switch for example comprising an accelerometer such that unauthorised attempts at removing the display module from a shelf are detectable, preferably such attempts are displayed on the unit and or communicated to a central office via the communicator;

display on a display module of whether any of the adjacent product items are available in a customer returns bay, such as adjacent a fitting room or with a customer services department, preferably such stock items are identifiable by a member of staff user a system input device such as a laser scanner to identify the product and location remote from the display position (shelf);

triangulation wherein two or more communicators are adapted to determine the location of a display module and to display the triangulation information to a user via a computer and or a display module;

perform a display of which customer is being served for example where queues and especially rather haphazard queues are formed for example at catalogue retailers e.g. Argos or IKEA stations, and or fast-food outlets for example;

display by the display module of instruction to a member of staff; and or display on a display module of the number of updates and or days left before a display module battery needs changing.

Beneficially the display module can comprise a touch screen and or switch to enable a user to scroll through detailed information, such as product specification, manual and so on, on a display, preferably wherein the display module comprises a principal display image for display to a user by way of default and a secondary image through which the user is able to review upon selection of the scroll option on the display module, more preferably wherein the principal image is written first to the display and a secondary image written at leisure through day, and or still more preferably wherein automatic return to the principal image is effected after a fixed time, such as 4-10 seconds.

Additionally a stock taking mode can be provided, wherein during selected periods, such as shop closed hours, the display is switched to a stock mode and a map of the layout for one or more shelves local to the display module are displayed instead of product information.

Figure 26:
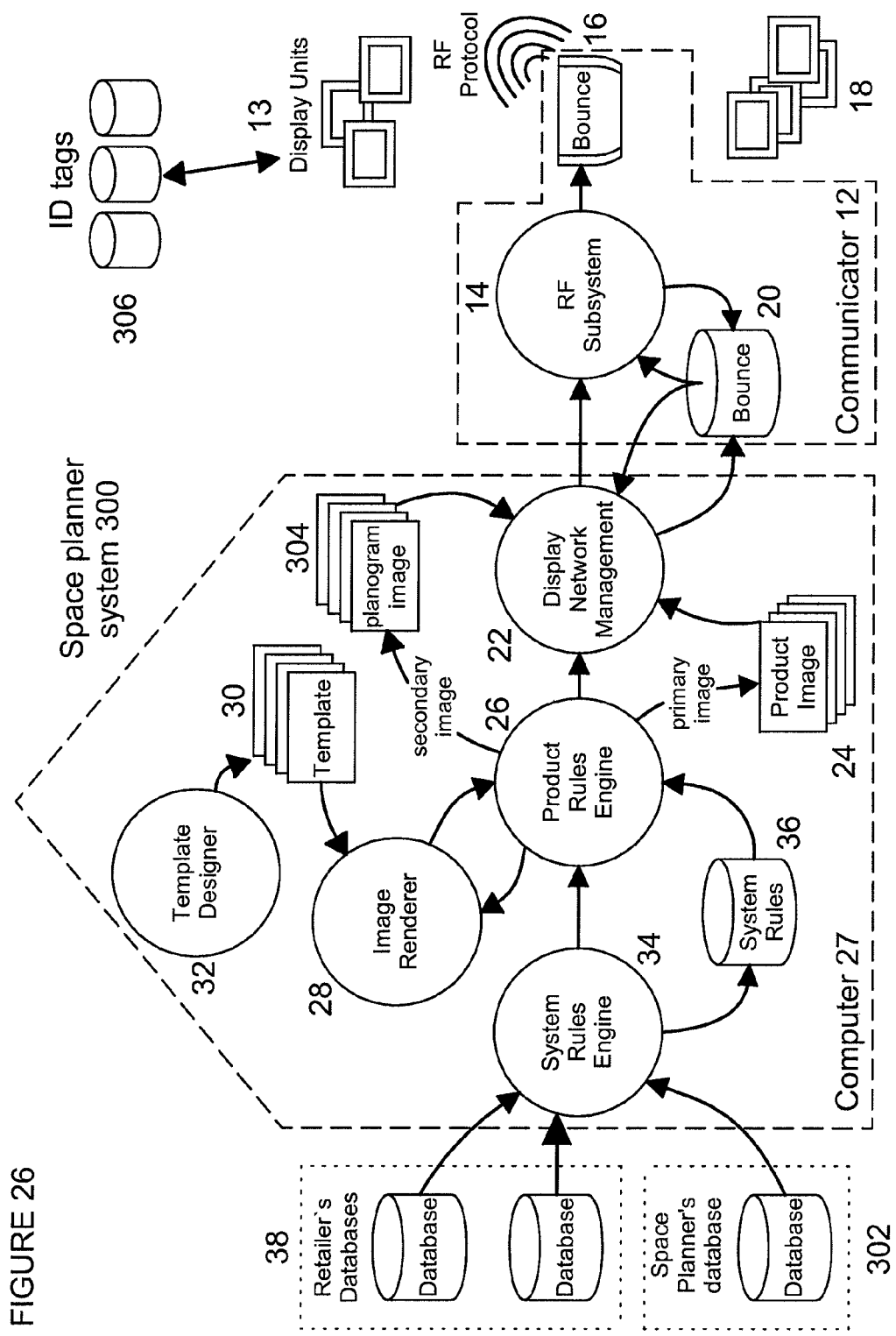
FIG. 26 is a schematic block diagram of a display system displaying space planning information according to a further aspect of the invention.

FIG. 26 shows a schematic diagram of the display system used in a space planner embodiment. There is shown a space planner display system 300 with the features of a display system 10 as numbered and described fully with reference to FIG. 1. There is also shown a space planner's database 302 a secondary image 304 of a planogram and some ID tags 306 attached to stock.

In a retail environment a planogram is a diagram which displays where the products and fixtures are to be displayed in order to maximise customer purchases. By tracking customers' shopping habits the planogram allows a retailer to optimise their layout of products within a store.

This embodiment combines the display units' 18 multiple image ability with the RF System's 14 ability to update groups of display units 18 very quickly. In a preferred embodiment the space planner system 300 uses the same infrastructure as the display system 10 and is enabled during down time in a store. This may be when a store is shut to customers or during periods of little or no customer activity e.g. in a store that is open 24 hours between the hours of 1 am to 6 am.

The space planner system 300 has an additional space planner database 302 which is combined with the retailer's database 38 and inputted to the system rules engine 34 to create the system rules 36. In the preferred embodiment data from the main retailer product and pricing database 38 is retrieved at predefined times and transformed into images for each product using a template 30 created for product pricing as stored in the template designer 32 and transmitted to the Display Unit's primary image store. These images are then immediately displayed and are the main product pricing/description image 24. In a further embodiment a command may be used at the computer 27 to retrieve the product information, this allows a retailer to take advantage of unexpectedly quite periods in a store.

Data from the space planning database 302 is transformed into an image for each product using a template 30 created for product layout or shelf positioning created in the template designer 32. These images are transmitted to the Display Unit's secondary image store 304 and do not get displayed until a specific update command is sent.

In the preferred embodiment system rules 36 are set up to send out a group update command to all display units 18 to show the secondary image 304 (i.e. the planogram) at a specific time and date. Though the group update command in further embodiments may be sent out on an ad hoc basis.

The second image 304 displays the planogram allowing store staff to determine how to replenish or re-stack the products on the shelf. In the preferred embodiment the system rules 36 define the time when the primary image 24 is displayed on the display unit 18. In a further embodiment the display unit 18 may switch between the primary image (i.e. the product image) and the secondary image (planogram) via an input. The input may be staff controlled; for instances if a member of staff is stocking the shelf during a quiet period when the store is still open, and a customer approaches a display unit 18 which is displaying the secondary image 304, the member of staff may cause the display unit 18 to revert to the primary image 24 for the customer's convenience until such time the customer passes.

In a further embodiment the display unit 18 further comprises a speaker, for example a piezoelectric speaker, that indicates when the image has changed from the primary image to the secondary image 308, or when the display unit 18 has changed the display in general. The sound would inform a shelf stacker when the updated planogram information is visible. Those skilled in the art will appreciate that the inclusion of a speaker to a display unit is not limited to the shelf stacking embodiment but is applicable to all embodiments of the display system 10 and its variants mentioned in this specification.

Figure 27:
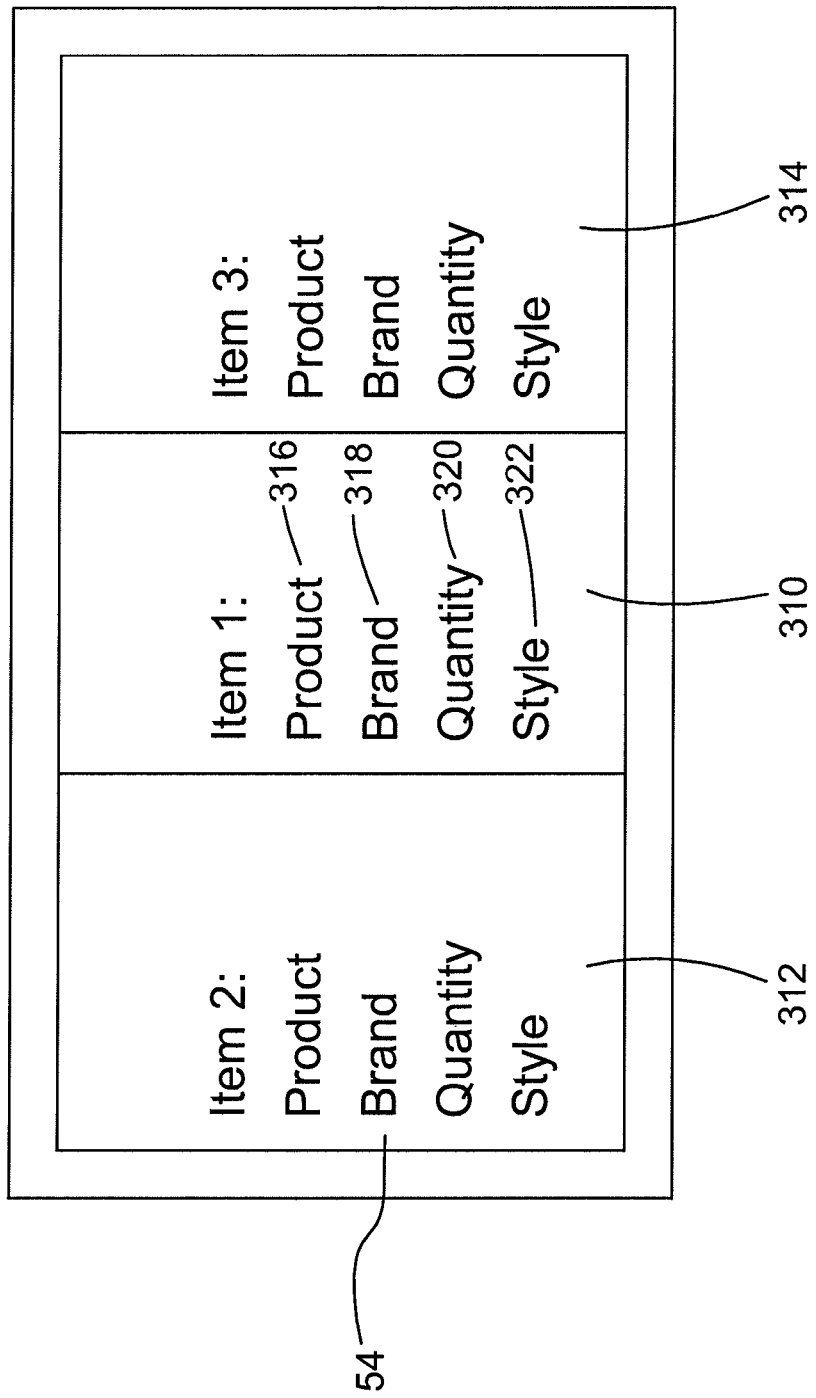
FIG. 27 is an example of a display showing space planning information.

FIG. 27 shows an example of the secondary image that may be displayed. A typical planogram in the art shows information covering a whole display and/or a whole store layout. Such information is unsuitable for a display system 10 or space planner system 300 due to the limited size of the screen in the retail based embodiment of the invention. FIG. 27 shows a display unit 18 comprising a display 54, which is split into three sections 310, 312, 314. Each section displays information 316, 318, 320, 322.

In the example shown, the display is divided into three sections 310, 312, 314 though depending on the number of products on a shelf, size of the display 54, position of the display unit 18 the number of sections may vary. In the preferred embodiment the display 54 shows three items, the item to which the display relates, in the middle section 310 and the item stacked to the left of it 312 and the item to the right of it 314.

The peripheral sections 312, 314 are for the shelf-stackers reference in the example of the display unit 18 showing a single item in the primary image.

In this example each section 310, 312, 314 contains information regarding the product to be stocked 316 e.g. a fizzy drink, the brand 318, quantity of product to be stocked 320 and optional information such as the style 322 the product should be stacked in e.g. a pyramid, individually etc. If the shelf is only stacking a single product the peripheral sections 312, 314 are not required and greater detail may be displayed regarding the product to be stacked may be displayed. In a further embodiment, the peripheral sections 312, 314 only contain information regarding the product 316 and/or brand 318 stacked for a stacker's reference, thereby requiring less space on the display and allowing more information to be displayed on the central section 310. In further embodiments the display shows the stacking information for the products on the shelves above and/or below the display unit 18. The information displayed in the secondary image is fully controllable from the template designer 32 and template 30 used.

To avoid confusion the central section 310, or the section with the information regarding the stacking information for the product is highlighted. This may involve the use of bold text, a different colour, larger text etc.

As a display unit 18 is typically small, 80 mm in height and 70 mm width, a text based approach to displaying the planogram is preferred. In further embodiments an image based planogram may also be used, displaying the products in a graphical format that is normally associated with a planogram.

In a further embodiment the display system 10 further comprises a series of RF transceivers 56 and tags 306 (FIG. 26), preferably RFD) tags on the stock. Each display unit 18 has a RF transceiver 56 which can be further enabled to detect all RFID tags 306 within a pre-determined range e.g. 2 metres. The RFID tags are placed on individual items of stock allowing the display unit 18 to detect the signals from items of stock which are within the range of the unit. The microcontroller 52 within the display unit 18 would be enabled to compare the detected RFID tags 306 detected, which in a preferred embodiment would transmit information an identifier allowing the determination of the product it is attached to, to the information that is being displayed on the display unit. Therefore, a measure of the levels of stock and what type of stock within the set range can easily be made. When the display unit 18 is next awoken, it transmits to the computer 27 back the number of products that are actually on the shelf, and the computer 27 would compare the number of stock left to the system rules 36 to determine whether replenishment is needed. The determination if a stock level may also be made at the microcontroller 52 which would send a message to the computer 27 to flag up a low level of stock.

Furthermore, to save power, the SYNC pulse includes an AWAKE SENSOR AND SCAN command. The AWAKE SENSOR AND SCAN command powers the RFID transceiver 56, detects all products with an RFID tag 306 with the predetermined range, determines what products are within range via the identifying signal of the RFID tag 306, transmits the information to the computer 27 and sends the RF transceiver 56 back to sleep mode. To further save power the timing of the AWAKE SENSOR AND SCAN command is time dependent. For instance, during peak shopping hours the AWAKE SENSOR AND SCAN command would be initiated regularly, for example every 10 minutes, and during times of low customer numbers where stocks are likely to remain approximately constant, every couple of hours.

Those skilled in the art will appreciate that the use of sensors is not limited to RFID tags and RF transceivers 56. The use of RFID tags 306 allows for an easy integration to the existing infrastructure where the RF transceiver 56 is already present in the display unit 18. Weight sensors to measure the current weight on stock on a shelf may also be used, where the amount of stock left would be proportional to the weight detected. A light sensor to detect the height of the stock on a shelf may also be used, which would give an indication of the level of stock. In the preferred embodiment the sensor is able to provide information regarding the type of stock. The information regarding the type of stock allows for the stock level of multiple items to be monitored in a single AWAKE SENSOR AND SCAN command.

Further in the retail sector, use of a display system can be made in a restaurant, for example to display information related to an order such as on a manually transportable, wireless display module, the customer being able to present the display module with number of the order and the items purchased included on a table selected by the customer thereby to inform the waiter of the location for the relevant order.

Further functionality can be provided such as in the following sectors:

Use of a display system in a medical environment, for example to enable one or more of hospital beds to be reserved; medical details of incumbent to be displayed; location known and required location displayed; time, place and medic name for forthcoming operation to be displayed; medicine frequency and doping levels displayed; identification numbers (e.g. cot to baby), surgical instruments, and or drug stocks to be displayed.

Use of a display system in a military environment, for example to enable command and control information to be sent to local command and preferably the local command can send (encoded) instructions, maps etc to personnel within a 200 m radius.

Use of a display system in a warehouse, for example to display location, stock level, local instructions (e.g. orders, addresses etc) throughout warehouse of items in the warehouse.

Finally, it is noted that the present system uses multiple timeslots for the individual ESL units (display modules 18) to greatly reduce the power consumption. For example, see FIG. 4, where 4 time slots are used.

The RF protocol optimises current consumption and bandwidth by using a combination of SYNC packets and Time Division Multiplexing (Timeslots). The communicator transmits a number of SYNC packets every timeslot (1.1 seconds). Each display is assigned to a timeslot based on its RF address. This scheme allows virtually 100% of the available bandwidth to be used but each display only has to wake up for its allocated timeslot. The number of timeslots may be any multiple of 2. Increasing the number of timeslots decreases the power consumption of the display, but results in a longer response time.

At the beginning of each Timeslot, a block containing an odd number of SYNC packets is sent. Each SYNC packet contains an offset from the middle SYNC packet (e.g. t=−2, t=−1, t=0, t=1, t=2 etc.), allowing the display to re-synchronise to the middle SYNC packet (t=0), by adjusting it's clock based on the packet offset of the first SYNC packet received. This makes the protocol resilient to clock drift by enabling the use of a less accurate and correspondingly lower cost crystal oscillator. Keeping the displays synchronised with the Communicator this way normally requires a low tolerance 32 KHz clock crystal, but it can also function from an internal RC oscillator within the microcontroller, providing further cost savings.

The inventors have found that there are significant power savings if each display module is woken approximately once every 8 seconds. However, in a practical environment a given module may fail to receive the synchronization signal for several SYNC pulses, due to RF interference in a busy supermarket (for example). Take our current system, wherein multiple SYNC packets are transmitted in each SYNC pulse.

If a total of 5 SYNC packets are used, the display's clock is allowed to drift by up to 3 SYNC packets (t=0, t=1, t=2) before losing synchronisation with the communicator 12 i.e. the clock can drift by up to 11.25 ms between each wakeup period. Each unit has a crystal oscillator that is specified to an accuracy of 20 parts per million: This means that the oscillator may drift by up to 0.16 ms between each wakeup period, allowing the display module 18 to loose a maximum of 70 SYNC pulses, or 616 seconds (70* Wakeup period) before having to conduct a re-synchronisation scan.

If a single SYNC packet were transmitted, then the drift would need to be accurate to within 3 ms. Thus, the liquid crystal module would require a resynchronisation scan after only 18 SYNC pulses, which is only 158 seconds.

If the unit (display module 18) has not received a SYNC pulse after a certain time (for example 50 to 100 time slots) the display module 18 conducts a re-scan to find the SYNC pulse. Rather than a short 3 ms burst in the high power mode, this process takes a full time slot which is typically is in the high power mode. That is, it is 333 times more power is consumed if the SYNC pulse is lost through RF interference. Such interference may come from electrical interference from surrounding objects, to changes in the display module's local environment (such as metallic objects, trolleys, and other local changes during the course of the working day in a supermarket). To counteract this issue, a series of SYNC pulses are emitted, including pulses both preceding and trailing the anticipated average time. This greatly increases the accuracy with which the units receive the SYNC pulse, and ensures that the power is kept to a minimum.

The retail environment is one where thousands of liquid crystal modules will be addressed from a single communicator. Not only are low cost and ultra-low power important, but so is reliability. The aspect of the invention using multiple SYNC pulse packet helps ensure ultra-low power consumption, whilst ensuring that re-sychronisation scans are rare, and the system is reliable.

The present invention also implements two additional processes to optimise the means by which display modules 18 can be brought back into synchronisation with the communicator 12:

Multicast (Resync):
A continuous stream of 'wakeup' packets is sent on the configuration channel (which is not subject to LBT (listen before talk) regulations), with the command byte set to 'resync'. These are sent for a period of approximately 15 seconds (i.e. greater than the total time for all timeslots), to ensure that all displays will have woken up in this period. The 'resync' command informs the display modules 18 that they should attempt to resynchronise after waiting 15 seconds to allow the communicator 12 time to start sending SYNC packets again. Only display modules 18 that are listening on the configuration channel will receive this command. In other words a default channel can be used which any display module 18 which is no longer in synchronisation with the communicator 12 listens to, to await a "resync" command, following which the display module 18 starts to listen on the appropriate channel for a sync signal for its appropriate timeslot.

Sync Storm:
In normal operation, the communicator 12 sends a number of sync packets (typically 5) at the start of a timeslot. In 'Sync Storm' mode, the communicator 12 sends continuous sync packets (on the normal communications channel, subject to LBT regulations), allowing display modules 18 that are out of sync to resynchronise without having to do a complete rescan. The sync storm lasts for a plurality, preferably three, complete series of timeslots as some display modules 18 may be too far out of sync for the offset in the sync packet to give enough information to allow them to recalculate the correct synchronisation time. Such a storm of sync communications preferably comprises a series of synchronisation packets within each timeslot for each of the groups of display modules 18. The series preferably commencing at the start and lasting the whole of the timeslot in a manner otherwise similar to the normal 5 sync signals (e.g. in terms of mark space ratios). Each signal preferably comprises a label according to the timeslot (group of display modules 18) it is for, and a relative position or time within the timeslot thereby to enable the display module to shift its wake up time to a different timeslot and or to a different time within a timeslot. Again, this "storm" is preferably transmitted for 3 complete series of timeslots.

Preferable forms of the invention include:

A display system wherein the display module comprises a touch screen and or switch to enable a user to scroll through detailed information, such as product specification, manual and so on, on a display, preferably wherein the display module comprises a principal display image for display to a user by way of default and a secondary image through which the user is able to review upon selection of the scroll option on the display module, more preferably wherein the principal image is written first to the display and a secondary image written at leisure through day, and or still more preferably wherein automatic return to the principal image is effected after a fixed time, such as 4-10 seconds.

A display system further comprising a memory store to store a plurality of images that may be displayed. Preferably where a first image stored is a product information images and wherein a second image is space planner image, and or comprising a stock taking mode, wherein during selected periods, such as shop closed hours, the display is switched to a stock mode and a space planner image local to the display module are displayed instead of product information.

Use of a display system in a medical environment, for example to enable one or more of hospital beds to be reserved; medical details of incumbent to be displayed; location known and required location displayed; time, place and medic name for forthcoming operation to be displayed; medicine frequency and doping levels displayed; identification numbers (e.g. cot to baby), surgical instruments, and or drug stocks to be displayed.

Use of a display system in a military environment, for example to enable command and control information to be sent to local command and preferably the local command can send (encoded) instructions, maps etc to personnel within a 200 m radius.

Use of a display system in a warehouse, for example to display location, stock level, local instructions (e.g. orders, addresses etc) throughout warehouse of items in the warehouse.

Use of a display system in a restaurant, for example to display the number of a restaurant is displayed on a manually transportable, wireless display module, the customer being able to present the display module with number of the order and the items purchased included on a table selected by the customer chooses to instruct the waiter of the location for the relevant order.

A display module for displaying information at a point of product display in a retail outlet, being adapted to communicate with a remote communicator which in use transmits display information to the display module, and to operate in a first, low power mode to display information and in a second, higher power mode periodically, in a predetermined manner, to communicate with the communicator thereby to obtain updated display information, the display module being further adapted to switch between first and second modes of operation between communications to enable low overall consumption of power by the display module.

A multiple display module for use in a system 10 comprising display communications module (57) and two or more display units (54') physically connected thereto, wherein the display communications module is adapted wirelessly to receive display data for the one or more display units.

A method of transferring data between a transmitter (communicator 16) and a receiver (display module 18) comprising the steps of defining a window size for a finite number of packets of data, transmitting the finite number of data packets, and transmitting at least a further packet of data up to the defined window size upon receipt by the transmitter of acknowledgement of receipt by the receiver of at least one of the finite number of packets of data, wherein the receiver acknowledges receipt of data packets in groups of two or more packets and the transmitter transmits further data up to the window size comprising unacknowledged data packets as well as newly transmitted data packets.

It is preferably wherein the duration the display module (18) stays in the higher power mode is variable depending on the content of the synchronisation component (74) and more preferably only sufficient to ensure receipt of essential information prior to switching back to the lower power mode.

Preferably in a display system wherein the synchronisation component (74) comprises a series of synchronisation packets (82) each data packet in the series comprising data related to the relative transmission of the data packet with respect to a primary data packet with the synchronisation component (74), the primary data packet is a central data packet in the series of data packets and more preferably wherein the series comprises three or more, and preferably seven, data packets on each side of the primary data packet, and the display module (18) is adapted to resynchronise switching between low power and higher power modes based on the relative position of a synchronisation data packet (82) received by the display module (18). Preferably, the display module is adapted in normal use to switch to a higher power mode in order to receive at least one synchronisation data packet (82), and preferably no more than two synchronisation data packets and thereafter to switch back to the lower power mode either to await the next synchronisation signal or a data signal assigned for the display module (18).

The invention claimed is:

1. A display system comprising a communicator and a plurality of remote display modules, the communicator in use transmitting display information to each of the remote display modules each of which is adapted in a lower power mode simply to display information and in a higher power mode periodically to communicate with the communicator to obtain updated display information, each of the remote display modules being adapted automatically to switch between the higher and lower power modes of operation between communications to enable low overall consumption of power by the display module, and wherein each of the remote display modules is assigned one of two or more time slots within which time slot to communicate with the communicator;

wherein the communicator, using a processor, transmits a two component signal comprising a synchronisation component containing information related to the synchronisation of communication with a display module and a data component comprising display information for updating the display module, wherein the synchronisation component comprises two or more synchronisation packets, each synchronisation packet comprising data related to a position of the synchronisation packet within the synchronisation component thereby to enable the display module to determine an accuracy of synchronisation of switching to the higher power mode to receive the transmission from the communicator, based on an offset of the position between one of the two or more synchronisation packets and another of the two or more synchronisation packets, and wherein the display module is adapted to automatically correct the synchronisation of communication with the communicator by determining clock drift of the display module based on the offset.

2. A display system according to claim 1 wherein communication between the communicator and the display module is synchronised according to a predetermined timing schedule using time division multiplexing, and the display module is configured to enable determination of the accuracy of the synchronisation of a periodic communication between the communicator and the display module.

3. A display system according to claim 1 wherein the communicator is adapted to transfer data to two or more display modules within a single data component of the signal and a display module is adapted periodically to switch to the higher power mode to check if data is being transmitted to it during the data component phase thereby to remain in the lower power mode for at least part of the data transfer component.

4. A display system according to claim 1 wherein the display module is adapted automatically to correct the synchronisation of communication with the communicator.

5. A display system according to claim 4 wherein the communicator is adapted to transmit a resynchronisation signal on a predetermined channel and any display module which is no longer synchronised with the communicator is adapted to listen on the predetermined channel for the resynchronisation signal whereafter the display module recommences listening for the two component signal comprising a synchronisation (wake up) component (following such a multicast resynchronisation).

6. A display system according to claim 4 wherein the communicator is adapted to send synchronisation signals to display modules 18 for an extended duration, preferably for a plurality of complete series of timeslots and more preferably 3 such series (in such a synchronisation storm).

7. A display system according to claim 1 wherein the synchronisation component comprises a series of synchronisation packets each data packet in the series comprising data related to the relative transmission of the data packet with respect to a primary data packet with the synchronisation component, and wherein the primary data packet is a central data packet in the series of data packets and the display module is adapted to resynchronise switching between low power and higher power modes based on the relative position of a synchronisation data packet received by the display module.

8. A display system according to claim 7 wherein the display module is adapted in normal use to switch to a higher power mode in order to receive at least one synchronisation data packet and thereafter to switch back to the lower power mode either to await the next synchronisation signal or a data signal assigned for the display module.

9. A display according to claim 1 wherein the display has a pre-assigned unique identifier a signal component representative of which is transmitted by the communicator in the event of a display update command to the display, and wherein the display acknowledges receipt of the unique identifier signal component before the communicator transmits updated image date for the display module.

10. A display system according to claim 1 comprising two or more display modules and wherein the communicator is adapted to transmit data in two or more timeslots during which timeslots data is transmitted for display modules associated with the relevant timeslot.

11. A display system according to claim 10 wherein each display module comprises a unique address and is assigned to a timeslot for communication with the communicator according to the address and more preferably based on the least significant bit of the address.

12. A display system according to claim 10 wherein the communicator transmits a timeslot id during each timeslot to enable a display module to determine if is it correctly synchronised with the communicator.

13. A display system according to claim 10 wherein during each timeslot the communicator transmits a synchronisation packet of data comprising one or more of a timeslot id, data representative of the time to a predetermined, preferably the centre, position of the synchronisation pulse period, and the address of each of the communications modules to receive information in the remainder of the timeslot.

14. A display system according to claim 1 wherein the display module is adapted to resynchronise with the communicator if it fails successfully to process an anticipated synchronisation signal transmitted by the communicator at predetermined repeat periods for predetermined signal durations, by remaining in a lower power mode for a shorter duration than the predetermined repeat period, and than in normal use, then switching to a higher power mode, for a period in the order of the predetermined signal duration, in order to detect a (sufficient part of the) synchronisation signal, and repeatedly to switch to a lower power mode after a failed attempt to detect a synchronisation signal and again remaining in the lower power mode for a period shorter duration than the predetermined repeat period before again switching to the higher power mode to detect the synchronisation signal.

15. A display system according to claim 14 wherein in the event the display module does not detect a valid synchronisation signal after a predetermined number of attempts the display model scans a different frequency, or range of frequencies, to determine if the communicator has switched transmission frequency, and wherein the display module scans in turn selected frequency ranges from a predetermined list of frequency ranges.

16. A display system according to claim 14 wherein the display module makes a predetermined number of attempts to detect a valid synchronisation signal before switching to a lower power state for an extended duration in the order two to three times that of the synchronisation signal repeat period, before recommencing a resynchronisation procedure.

17. A display system according to claim 1 comprising a data transfer protocol based on a modified sliding window protocol, under which unmodified protocol upon receipt of certain, but not necessarily all transmitted data packets by a display module, a communicator only transmits further data packets sequentially up to a defined maximum data size, but wherein under the modified protocol data packets are acknowledged by group rather than individually and or sequentially, and wherein the display module communicates an acknowledgement signal comprising a group of data identifying individual packets of data which have been received, and or wherein, non-sequential packets of data may be unacknowledged and require retransmission, more preferably the system is able to adapt the acknowledgement protocol depending on the level of the bit error ratio, and preferably three possible protocols are provided for low, medium and high BER.

18. A display system according to claim 1 comprising a plurality of display modules, the system being adapted to group two or more such display modules and to communicate with grouped display modules in the same data transfer session, and preferably wherein a group update is repeated to attempt an accurate update across all displays in the group, whereafter any individual displays not having accurately received the update data can be addressed serially by the communicator, wherein image data is transferred to display modules in a group over a period of time and stored in each of the display modules, the display modules in the group being switchable to the display the stored image upon a group update command from the communicator.

19. A display system according to claim 1 wherein the communicator is adapted to transmit display information periodically to two or more groups of one or more display modules in two or more predetermined timeslots each timeslot being associated with a group of display modules, and wherein the communicator is adapted to transmit in four timeslots for different groups of display modules using a time division multiplexing protocol.

20. A display system according to claim 1 wherein the system is used for displaying information at a point of product display in a retail outlet.

21. A display system comprising a communicator and a plurality of remote display modules, the communicator is used in transmitting display information to each of the remote display modules, each of which is adapted in a lower power mode simply to display information and in a higher power mode periodically to communicate with the communicator to obtain updated display information, each of the remote display modules being adapted automatically to switch between the higher and lower power modes of operation between communications to enable low overall consumption of power by the display module, and wherein each of the remote display modules is adapted automatically to correct the synchronisation of communication with the communicator, wherein the communicator, using a processor, transmits a synchronisation signal comprising two or more synchronisation packets to a display module, each synchronisation packet comprising data related to a position of the synchronisation packet within the synchronisation signal thereby to enable the display module to determine an accuracy of synchronisation of switching to the higher power mode, based on an offset of the position between one of the two or more synchronisation packets and another of the two or more synchronisation packets, and wherein the display module is adapted to automatically correct the synchronisation of communication with the communicator by determining clock drift of the display module based on the offset.

* * * * *